(12) United States Patent
Shin et al.

(10) Patent No.: US 11,526,043 B2
(45) Date of Patent: Dec. 13, 2022

(54) DISPLAY DEVICE HAVING DAM PATTERN WITH TRENCH

(71) Applicant: Samsung Display Co., Ltd., Yongin-si (KR)

(72) Inventors: Dong Hee Shin, Anyang-si (KR); Yoo Mi Ra, Ansan-si (KR); Geun Ho Lee, Hwaseong-si (KR); Yong Hee Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/000,346

(22) Filed: Aug. 23, 2020

(65) Prior Publication Data
US 2021/0141264 A1    May 13, 2021

(30) Foreign Application Priority Data

Nov. 12, 2019  (KR) .................. 10-2019-0144065

(51) Int. Cl.
| | | |
|---|---|---|
| *G02F 1/1333* | (2006.01) | |
| *G02F 1/1368* | (2006.01) | |
| *G02F 1/1337* | (2006.01) | |
| *G02F 1/01* | (2006.01) | |
| *G02F 1/1679* | (2019.01) | |

(Continued)

(52) U.S. Cl.
CPC ...... *G02F 1/133345* (2013.01); *G02F 1/0107* (2013.01); *G02F 1/1339* (2013.01); *G02F 1/1368* (2013.01); *G02F 1/133723* (2013.01); *G02F 1/161* (2013.01); *G02F 1/1679* (2019.01); *G02F 1/13458* (2013.01); *G02F 1/136222* (2021.01); *G02F 1/136227* (2013.01)

(58) Field of Classification Search
CPC combination set(s) only.
See application file for complete search history.

(56) References Cited

U.S. PATENT DOCUMENTS

| | | |
|---|---|---|
| 9,570,481 B2 | 2/2017 | Lee et al. |
| 9,864,225 B2 | 1/2018 | Hong et al. |

(Continued)

FOREIGN PATENT DOCUMENTS

| | | |
|---|---|---|
| KR | 10-2015-0094815 | 8/2015 |
| KR | 10-2016-0105652 | 9/2016 |

(Continued)

*Primary Examiner* — Lauren Nguyen
(74) *Attorney, Agent, or Firm* — H.C. Park & Associates, PLC

(57) ABSTRACT

A display device including a display area and a non-display area disposed outside the display area, the display device including a first display substrate, a second display substrate opposite to the first display substrate, and a sealing member disposed between the first display substrate and the second display substrate in the non-display area and coupling the first display substrate to the second display substrate, in which the first display substrate includes a first substrate and an organic layer disposed on the first substrate, the organic layer includes a plurality of dam patterns disposed in the non-display area, and the dam patterns include a first dam pattern not overlapping the sealing member and having a first trench formed on a surface of the first dam pattern, and a second dam pattern overlapping the sealing member.

20 Claims, 21 Drawing Sheets

(51) Int. Cl.
*G02F 1/1339* (2006.01)
*G02F 1/161* (2006.01)
*G02F 1/1345* (2006.01)
*G02F 1/1362* (2006.01)

(56) References Cited

U.S. PATENT DOCUMENTS

| | | | | |
|---|---|---|---|---|
| 2006/0267016 A1* | 11/2006 | Ahn | .................... | H01L 27/1288 |
| | | | | 257/59 |
| 2015/0062515 A1* | 3/2015 | Tomioka | ........... | G02F 1/133345 |
| | | | | 349/123 |
| 2015/0168771 A1* | 6/2015 | Kim | .................. | G02F 1/136204 |
| | | | | 257/72 |
| 2017/0199431 A1* | 7/2017 | Kim | .................. | G02F 1/133514 |
| 2018/0031888 A1* | 2/2018 | Yu | ....................... | G02F 1/13394 |

FOREIGN PATENT DOCUMENTS

| | | |
|---|---|---|
| KR | 10-2017-0044327 | 4/2017 |
| KR | 10-2018-0024730 | 3/2018 |
| KR | 10-2018-0111444 | 10/2018 |

* cited by examiner

DISPLAY DEVICE HAVING DAM PATTERN WITH TRENCH

CROSS-REFERENCE TO RELATED APPLICATION

This application claims priority from and the benefit of Korean Patent Application No. 10-2019-0144065, filed on Nov. 12, 2019, which is hereby incorporated by reference for all purposes as if fully set forth herein.

BACKGROUND

Field

Exemplary embodiments of the invention relate generally to a display device and, more specifically, to a display device including a plurality of dam patterns.

Discussion of the Background

With the development of multimedia, the importance of display devices is increasing. Accordingly, various kinds of display devices, such as organic light emitting is displays (OLEDs) and liquid crystal displays (LCDs), are being used. An LCD is one of widely used flat display devices, which includes two substrates in which field generating electrodes, such as pixel electrodes and common electrodes, are formed and a liquid crystal layer disposed between the two substrates. In the LCD, a voltage is applied to the field generating electrodes to generate an electric field across the liquid crystal layer. In this manner, an orientation of liquid crystal molecules of the liquid crystal layer may be determined and polarization of incident light is controlled to thereby display an image.

The LCD generally includes a display area in which an image is displayed, and a non-display area in which various signal lines are disposed to display the image in the display area. Recently, the non-display area is becoming narrow in order to realize an LCD having a narrow bezel. In this case, due to a narrow space of the non-display area, an arrangement of various lines, interference with the display area, and the like become issues.

The above information disclosed in this Background section is only for understanding of the background of the inventive concepts, and, therefore, it may contain information that does not constitute prior art.

SUMMARY

Display devices constructed according to exemplary embodiments of the invention are capable providing high reliability by minimizing generation of outgassing.

Additional features of the inventive concepts will be set forth in the description which follows, and in part will be apparent from the description, or may be learned by practice of the inventive concepts.

A display device according to an exemplary embodiment includes a display area and a non-display area disposed outside the display area, the display device including a first is display substrate, a second display substrate opposite to the first display substrate, and a sealing member disposed between the first display substrate and the second display substrate in the non-display area and coupling the first display substrate to the second display substrate, in which the first display substrate includes a first substrate and an organic layer disposed on the first substrate, the organic layer includes a plurality of dam patterns disposed in the non-display area, the plurality of dam patterns include a first dam pattern which does not overlap the sealing member and having a first trench on a surface of the first dam pattern, and a second dam pattern which overlaps the sealing member.

The organic layer may includes a photosensitive organic material having at least one of a red pigment, a green pigment, and a blue pigment.

The first dam pattern may include the photosensitive organic material having the blue pigment.

The organic layer may further include a color filter disposed in the display area.

The first dam pattern and the second dam pattern may include substantially the same material.

The first trench may extends on a surface of the first dam pattern in a direction parallel to a direction in which the first dam pattern extends.

The second dam pattern may include a second trench.

The first dam pattern and the second dam pattern may have substantially the same form.

The display device may further include an insulating layer disposed on the organic layer.

The insulating layer disposed on the first dam pattern may include a third trench overlapping the first trench, and the first trench and the third trench may form a trench structure.

The display device may further include a first orientation film disposed on the insulating layer.

The first orientation film may be disposed on the first trench and contact at least a part of the first dam pattern.

A display device according to another exemplary embodiment includes a first substrate having a display area and a non-display area, a plurality of pixels disposed in the display area, a gate conductive layer disposed on the first substrate, a gate insulating layer disposed on the gate conductive layer, a semiconductor layer disposed on the gate insulating layer, a data conductive layer disposed on the semiconductor layer, an organic layer disposed on the data conductive layer, and a pixel electrode disposed on the organic layer, in which the organic layer includes a plurality of color filters disposed in pixels and a plurality of dam patterns disposed in a non-display area, and at least one of the dam patterns include a trench in an upper surface thereof.

The display device may include a second substrate opposite to the first substrate, and a liquid crystal layer disposed between the second substrate and the pixel electrode.

The display device may further include a sealing member disposed on an edge of the display device to couple the first substrate to the second substrate.

The dam patterns may include a first dam pattern which does not overlap the sealing member and has the trench in a surface thereof, and a second dam pattern which overlaps the sealing member.

The display device may further include a capping layer disposed between the organic layer and the pixel electrode, in which the capping layer may cover a part of the upper surface of the first dam pattern and exposes the trench.

The capping layer may cover substantially the entire upper surfaces of the color filters.

The display device may further include a first orientation film disposed on the first substrate between the pixel electrode and the second substrate.

The first orientation film may be disposed to overlap at least a part of the trench of the first dam pattern and may not overlap the second dam pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
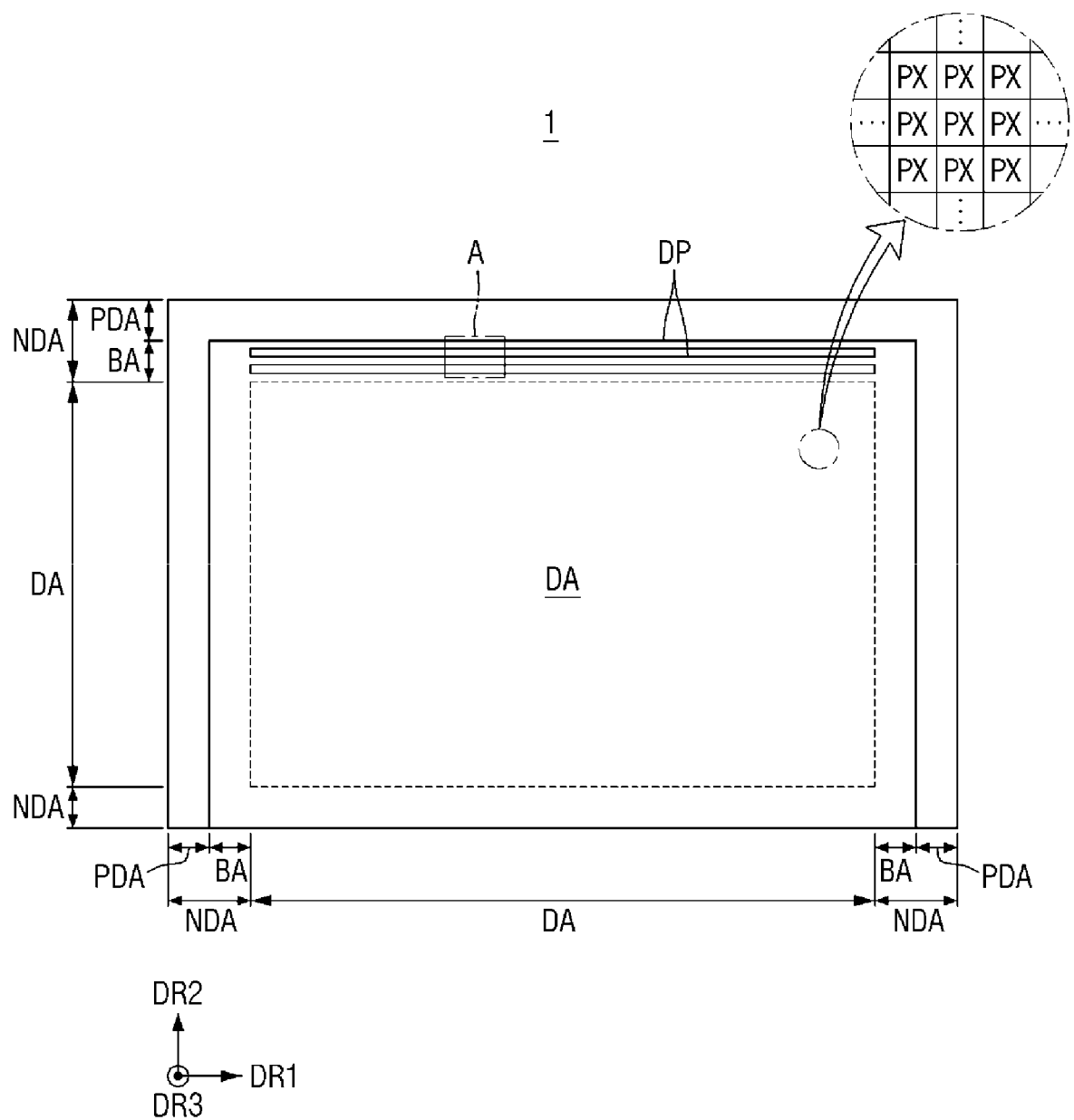
FIG. 1 is a plan view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described is order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
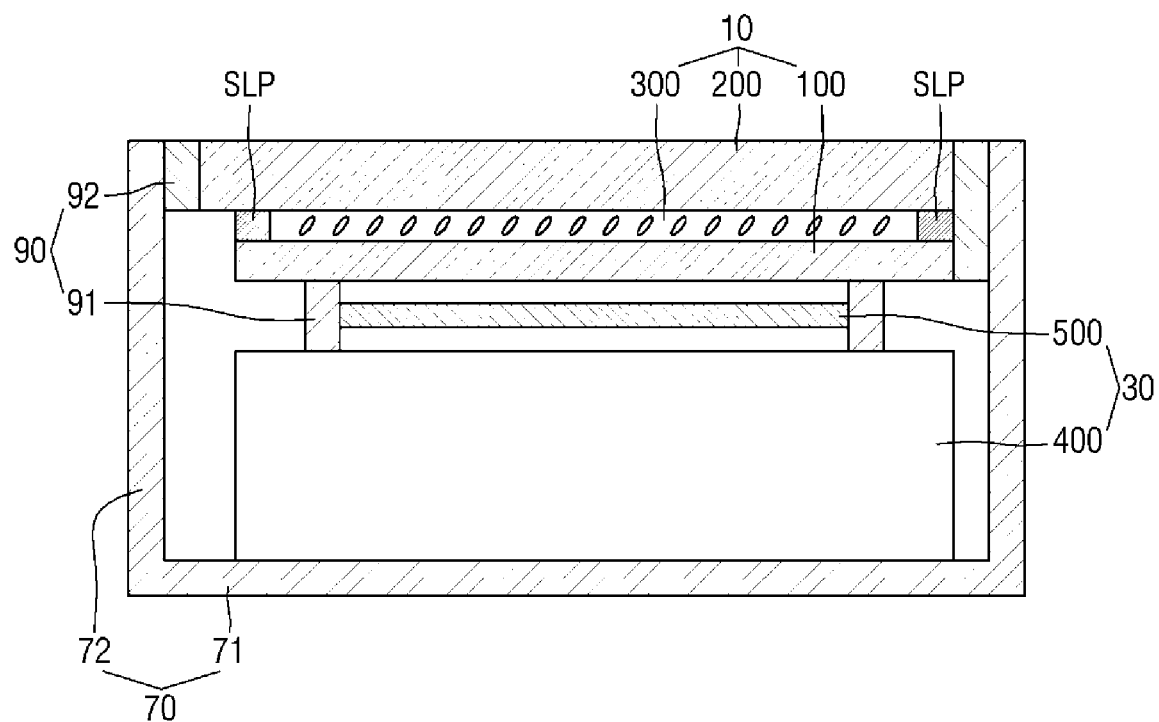
FIG. 2 is a schematic cross-sectional view of the display device according to an exemplary embodiment.

FIG. 1 is a plan view illustrating a display device according to an exemplary embodiment. FIG. 2 is a schematic cross-sectional view illustrating the display device according to an exemplary embodiment.

Referring to FIGS. 1 and 2, a display device 1 is a device configured to display a video or image, and may include various electronic devices, such as television sets, external billboards, monitors, personal computers (PCs), notebook computers, tablet PCs, smartphones, car navigation units, cameras, central information displays (CIDs) for vehicles, wristwatch type electronic devices, personal digital assistants (PDAs), portable multimedia players (PMPs), and game machines.

In the drawings, a first direction DR1, a second direction DR2, and a third direction DR3 are illustrated. The first direction DR1 and the second direction DR2 may be directions perpendicular to each other on one plane. The third direction DR3 may be a direction perpendicular to the first direction DR1 and the second direction DR2. The third direction DR3 is perpendicular to each of the first direction DR1 and the second direction DR2. In exemplary embodiments, the third direction DR3 denotes a thickness direction of the display device 1.

The display device 1 may have substantially a rectangular form in which a length thereof in the first direction DR1 is greater than a length thereof in the second direction DR2, but is not limited thereto. A display surface of the display device 1 may be disposed at one side in the third direction DR3, which is the thickness direction. As used herein, an upper side denotes one side in the third direction DR3, that is, a display direction, and similarly, an upper surface denotes a surface facing one side in the third direction DR3, unless stated otherwise. In addition, a lower side denotes the other side in the third direction DR3, that is, an opposite direction of the display direction, and a lower surface denotes a surface facing the other side in the third direction DR3, unless stated otherwise.

The display device 1 includes a display area DA and a non-display area NDA disposed outside the display area DA. The display area DA is an area in which an image may be displayed, and the non-display area NDA is an area in which an image is not displayed. The display area DA may refer to an active area and the non-display area NDA may refer to an inactive area.

The display area DA may be positioned at a central portion of the display device 1. The display area DA may have substantially a rectangular shape, but is not limited thereto. For example, the display area DA may also have a square shape, a quadrilateral shape having round corners (vertices), another polygonal shape, a circular shape, or the like.

A plurality of pixels PX are disposed in the display area DA. The pixels PX are arrayed in the display area DA in a matrix direction, and each of the pixels PX includes a color filter CF, a pixel electrode PXE, and a thin film transistor Tr disposed therein.

The non-display area NDA may be disposed around the display area DA. The non-display area NDA may surround the entirety or a part of the display area DA. The display area DPA may have substantially a rectangular shape, and the non-display area NDA may be disposed close to four sides of the display area DPA. In the drawings, the non-display area NDA is illustrated as surrounding the display area DA, but is not limited thereto, and the non-display area NDA may be disposed close to only one side or the other side of the display area DA, or may also be disposed close to one side or both sides of the display area DA with reference to the display area DA.

The non-display area NDA includes a pad area PDA and a border area BA disposed between the pad area PDA and the display area DA.

A driving element or driving circuit configured to drive the display area DA may be disposed in the non-display area NDA. In an exemplary embodiment, the pad area PDA may be positioned in a first non-display area NDA disposed close to a first long side (upper side in FIG. 1), a second display area NDA disposed close to a first short side (left side in FIG. 1), and a third display area NDA disposed close to a second short side (right side in FIG. 1) in the display device 1. In the pad area PDA, a pad is provided on a display substrate of the display device 1, and an external device may be mounted on a pad electrode of the pad. For example, the external device may be a connection film, a printed circuit board, a driving chip (DIC), a connector, a wiring film, or the like.

A plurality of dam patterns DP may be disposed in the border area BA. The dam patterns DP may suppress an orientation liquid that forms a first orientation film 190 from spreading to the pad area PDA when the orientation liquid is applied. The dam patterns DP may be disposed on at least one side of each of the border area BA. In FIGS. 1 and 2, the dam patterns DP are disposed only at only one side of the display device, but the inventive concepts are not limited thereto.

The dam patterns DP1 and DP2 will be described in detail below.

Referring to FIG. 2, the display device 1 may include a display panel 10, a backlight unit 30 disposed under the display panel 10 to provide light to the display panel 10, and a housing 70 accommodating the backlight unit 30 and the display panel 10.

The display panel 10 may be irradiated with light emitted from the backlight unit 30 to display an image. The display panel 10 may be a light receiving display panel, such as a liquid crystal display panel, an electro-wetting display panel, or an electrophoresis display panel. Hereinafter, the display panel 50 will exemplarily be described with reference to a liquid crystal panel (LCD). However, the inventive concepts are not limited thereto, and the display panel 50 may be another kind of display panel.

The display panel 10 includes a plurality of pixels. The pixels of the display panel 10 may be arrayed in a matrix form. The display panel 10 may include a switching element and a pixel electrode provided for each pixel, and a common electrode facing the pixel electrode.

As illustrated in FIG. 2, the display panel 10 may include a first display substrate 100 and a second display substrate 200 opposite to the first display substrate 100. The display panel 10 may further include a liquid crystal layer 300 disposed between the first display substrate 100 and the second display substrate 200. The first display substrate 100 and the second display substrate 200 may overlap each other. In an exemplary embodiment, one substrate may be larger than the other substrate, and thus, one substrate may protrude further outward than the other substrate. In the drawing, since the second display substrate 200 is larger than the first display substrate 100, the second display substrate 200 may protrude further outward than the first display substrate 100. Since the second display substrate 200 protrudes further than the first display substrate 100, a region formed between the housing 70 and the backlight unit 30 may provide a space in which a driving chip is mounted on an external circuit substrate. However, the inventive concepts are not limited thereto. A sealing member SLP may be disposed on an edge of the first display substrate 100 and an edge of the second display substrate 200 to accommodate liquid crystal molecules of the liquid crystal layer 300.

The display panel 10 will be described in more detail below.

The backlight unit 30 is disposed under the display panel 10. The backlight unit 30 may include a light source member 400 and an optical film 500.

The light source member 400 may include a plurality of light sources. In the illustrated exemplary embodiment, the backlight unit 30 may be a direct type backlight unit. When the backlight unit 30 is the direct type backlight unit, the light source member 400 may include the light sources and a circuit substrate. The light sources emit light to be provided to the display panel 10. Light emitted by the light sources may be incident on the optical film 500. In the illustrated exemplary embodiment, the light sources may be light emitting diodes, but the inventive concepts are not limited thereto. For example, the light sources may include any components capable of emitting light. The light sources may be mounted on the circuit substrate. The circuit substrate may transmit a light source driving signal, which is transmitted from the outside, to the light sources mounted on the circuit substrate.

The optical film 500 may be disposed above the light source member 400. The optical film 500 may include an optical sheet and/or an optical plate. For example, the optical sheet may be a prism sheet, a micro lens, a lenticular sheet, a diffusion sheet, a polarization sheet, a reflective polarization sheet, a phase difference sheet, a protective sheet, or the like. The optical plate may be, for example, a diffusion plate, a light guide plate, or the like. When multiple optical films 500 are applied, the optical films 500 may be disposed to overlap or be spaced apart from each other.

The diffusion plate may diffuse light emitted from the light source member 400 toward the display panel 10. The prism sheet may refract a path of light to increase front brightness. The reflective polarization sheet may increase brightness by transmitting light of a specific polarization, reflecting light of other polarizations, and recycling the light.

The housing 70 accommodates the backlight unit 30 and the display panel 10. The housing 70 may include a bottom chassis or bracket. In some exemplary embodiments, the housing 70 may further include a top chassis. The housing 70 may include a bottom surface 71 and a sidewall 72. The light source member 400 of the backlight unit 30 may be disposed on the bottom surface 71 of the housing 70.

The optical film 500 and the display panel 10 may be attached or fixed by a plurality of adhesives 90. The adhesives 90 may include a first adhesive 91 and a second adhesive 92. Each of the adhesives 90 may include a polymer resin, an adhesive, or a sticky tape. In addition, the adhesives 90 may provide a light transmission blocking function. For example, the adhesives 90 may include light absorbing or reflecting materials, such as a black pigment or dye, to provide the light transmission blocking function. However, the inventive concepts are not limited thereto.

The first adhesive 91 may adhere or fix the optical film 500. The first adhesive 91 may be adhered to an edge of the optical film 500. For example, the first adhesive 91 may be disposed to surround the edge of the optical film 500 to fix the optical film 500.

The second adhesive 92 may adhere or fix the display panel 10 to the housing 70. The second adhesive 92 may be disposed at an edge of the display panel 10. In the drawing, the second adhesive 92 is illustrated as being disposed at the edge of the first display substrate 100 and an edge of one side of the second display substrate 200, without being limited thereto. The display panel 10 may be fixed to the sidewall 72 of the housing 70 using the second adhesive 92. However, the inventive concepts are not limited thereto, and the above members may be placed on another seating structure of the housing 70, or may also be placed on or adhered to a mold frame provided in the housing 70.

Figure 3:
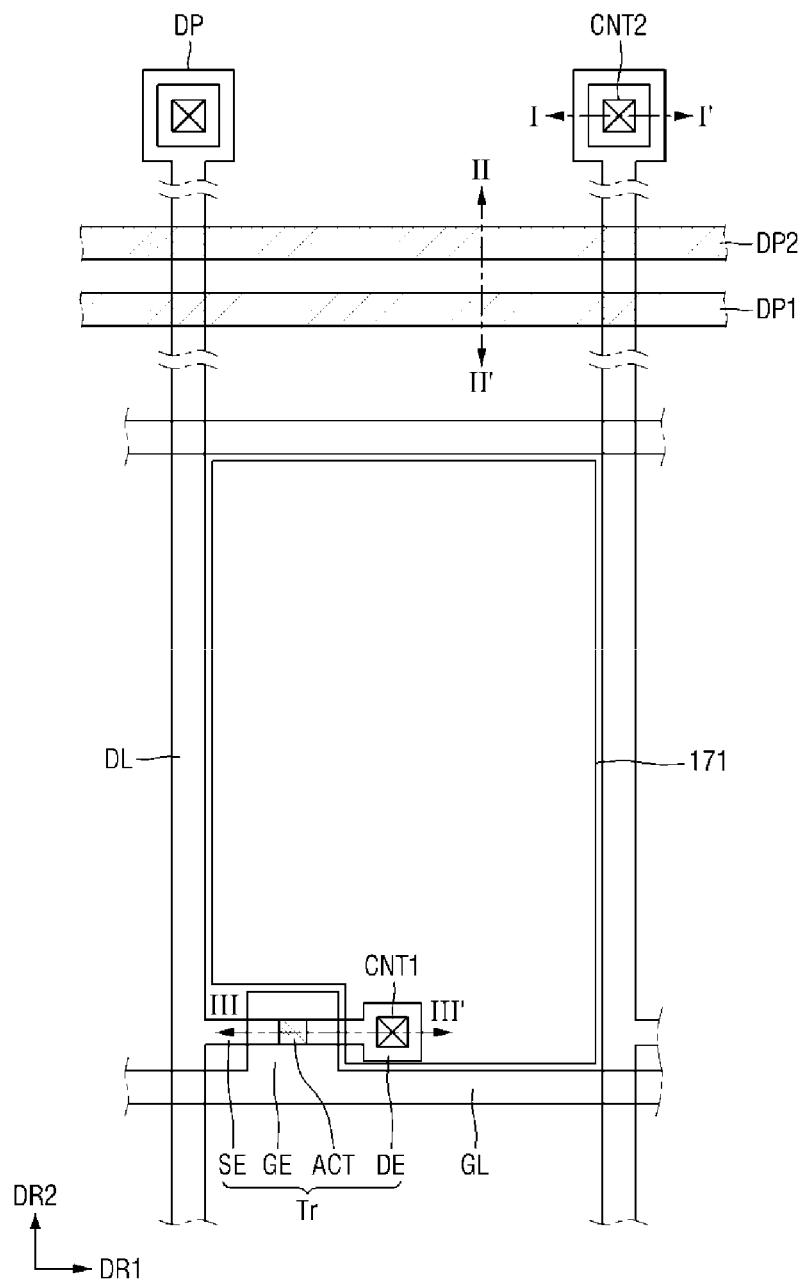
FIG. 3 is a partially enlarged view illustrating a structure of one pixel in the display device according to an exemplary embodiment.
Figure 4:
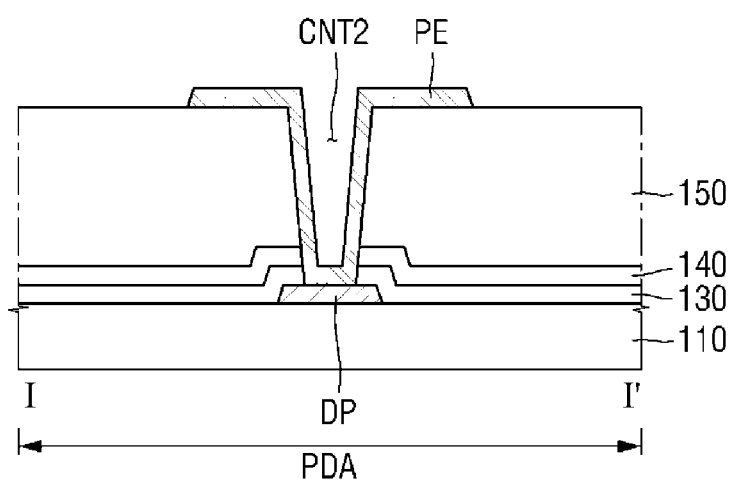
FIG. 4 is a cross-sectional view taken along line I-I' of FIG. 3.
Figure 5:
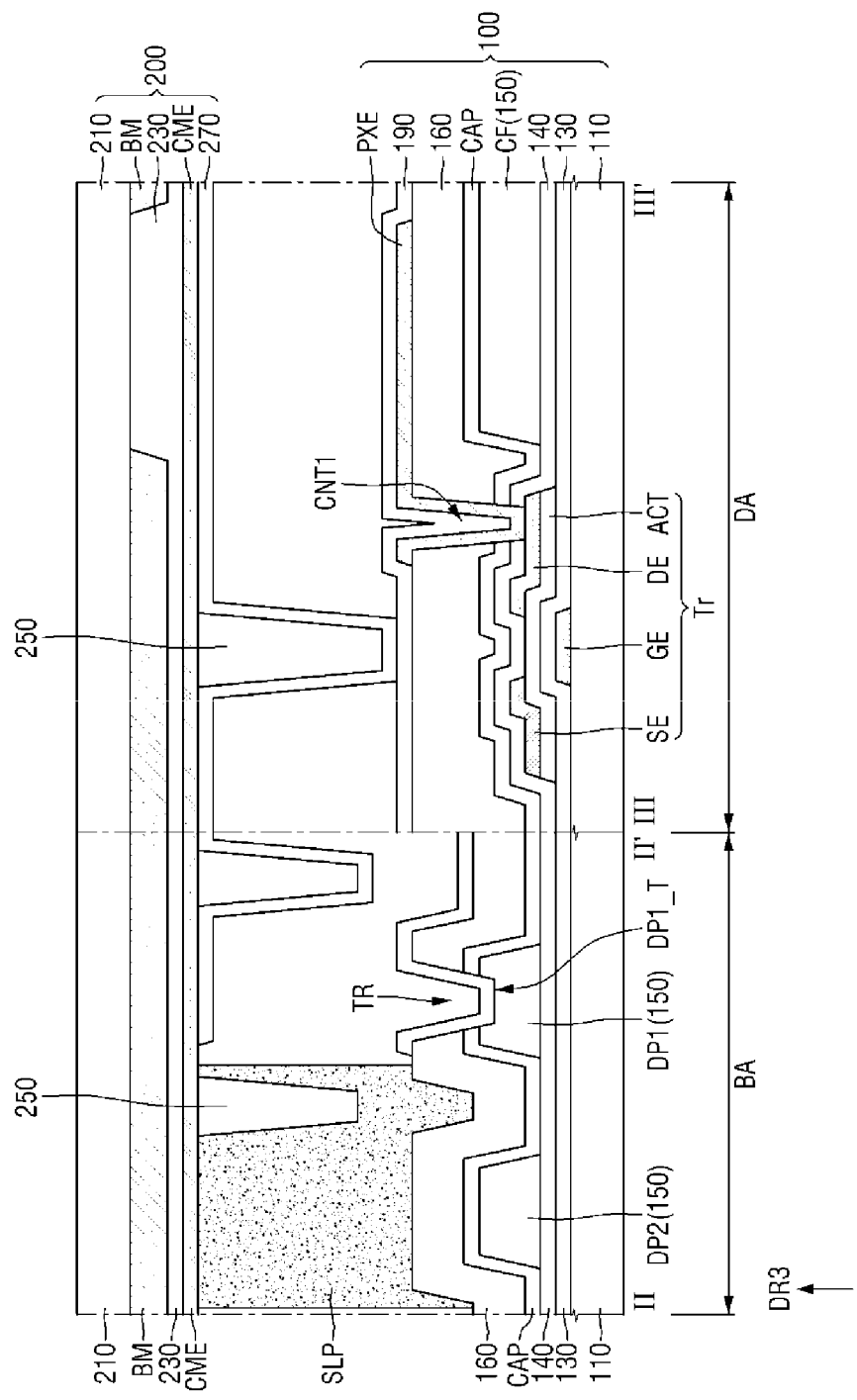
FIG. 5 shows cross-sectional views taken along lines II-II' and III-III' of FIG. 3.

FIG. 3 is a partially enlarged view illustrating a structure of one pixel in the display device according to an exemplary embodiment. FIG. 4 is a cross-sectional view taken along line I-I' of FIG. 3. FIG. 5 shows cross-sectional views taken along lines II-II' and III-III' of FIG. 3.

Hereinafter, the display panel 10 will be described in detail with reference to FIGS. 3 to 5.

As described above, the display panel 10 includes the first display substrate 100, the second display substrate 200, and the liquid crystal layer 300.

The first display substrate 100 may include a first substrate 110, a gate electrode GE, a semiconductor layer ACT, a source electrode SE, a drain electrode DE, an organic layer 150, the pixel electrode PXE, and the first orientation film 190.

The first substrate 110 of the first display substrate 100 may be an insulating substrate. The first substrate 110 may include a transparent material. For example, the first substrate 110 may include a transparent insulating material, such as glass or quartz. However, the first substrate 110 is not limited thereto, and the first substrate 110 may also include plastic such as polyimide, and may have a flexible property in which the first substrate 110 is twistable, bendable, foldable, or rollable.

A gate conductive layer may be disposed on the first substrate 110 in the display area DA. In the gate conductive layer, a gate line GL extending in the first direction DR1 and the gate electrode GE protruding from the gate line GL are formed. The gate line GL may extend to the border area BA of the non-display area NDA and the pad area PDA, and a gate pad may be formed in the pad area PDA.

The gate conductive layer including the gate line GL, the gate electrode GE, and the gate pad may have a single or multi-film structure formed of an aluminum-based metal such as aluminum and an aluminum alloy, a silver-based metal such as silver and a silver alloy, a copper-based metal such as copper and a copper alloy, a molybdenum-based metal such as molybdenum and a molybdenum alloy, chromium, tantalum, titanium, or the like.

A gate insulating layer 130 is disposed on the first substrate 110, the gate line GL, and the gate electrode GE in the display area DA. The gate insulating layer 130 may be disposed to cover the gate electrode GE. The gate insulating layer 130 may be formed on substantially the entire first substrate 110, and may be disposed to extend to the non-display area NDA.

The gate insulating layer 130 may include a silicon compound, a metal oxide, or the like. For example, the gate insulating layer 130 may include silicon oxide, silicon nitride, silicon oxynitride, aluminum oxide, tantalum oxide, hafnium oxide, zirconium oxide, titanium oxide, or the like.

The semiconductor layer ACT may be disposed on the gate insulating layer 130 in the display area DA. At least a part of the semiconductor layer ACT may overlap the gate electrode GE. The semiconductor layer ACT may include amorphous silicon, polycrystalline silicon, or an oxide semiconductor.

A data conductive layer may be disposed on the gate insulating layer 130 and the semiconductor layer ACT in the display area DA. The data conductive layer may include a data line DL, the source electrode SE, and the drain electrode DE.

The data line DL extending in the second direction DR2 is disposed on the gate insulating layer 130 in the display area DA. The data line DL may extend to the border area BA and the pad area PDA of the non-display area PDA, and a data pad DP may be formed in the pad area PDA. The gate line GL and the data line DL may intersect with each other to define a pixel area. More particularly, the pixel area may be defined as an area surrounded by the gate line GL and the data line DL, and the pixel PX may be disposed in the pixel area.

The source electrode SE branched from the data line DL and the drain electrode DE spaced apart from the source electrode SE are disposed on the semiconductor layer ACT in the display area DA. At least a part of the source electrode SE and at least a part of the drain electrode DE may overlap the gate electrode GE. The source electrode SE and the drain electrode DE may be connected to the semiconductor layer ACT.

Each of the data line DL, the source electrode SE, and the drain electrode DE may have a single or multi-film structure formed of aluminum, copper, silver, molybdenum, chromium, titanium, tantalum, alloys thereof, or the like.

The gate electrode GE, the source electrode SE, the drain electrode DE, and the semiconductor layer ACT may form a thin film transistor Tr, which is one switching element. The thin film transistor Tr may be disposed in the display area DA. FIG. 3 exemplarily shows one thin film transistor disposed in one pixel, but the inventive concepts are not limited thereto. In some exemplary embodiments, the thin film transistor disposed in one pixel may be provided as a plurality of thin film transistors. In this case, one pixel may also be divided into a plurality of areas to correspond to the thin film transistors.

A first insulating layer 140 may be disposed on the source electrode SE, the drain electrode DE, and the gate insulating layer 130. The first insulating layer 140 may be disposed to cover the source electrode SE, the drain electrode DE, and the gate insulating layer 130. The first insulating layer 140 may be formed on substantially the entire first substrate 110, and may be disposed to extend the non-display area NDA.

An opening exposing at least a part of the drain electrode DE may be formed in the first insulating layer 140 in the display area DA. A second contact hole CNT2 exposing at least a part of the data pad DP may be formed in the first insulating layer 140 in the pad area PDA of the non-display area NDA.

The first insulating layer 140 may include an inorganic insulator, such as silicon oxide, silicon nitride, or silicon oxynitride. The first insulating layer 140 may protect the thin film transistor Tr and prevent a material included in the organic layer 150 from being introduced into the semiconductor layer ACT.

The organic layer 150 may be disposed on the first insulating layer 140. The organic layer 150 may be disposed in the display area DA and the border area BA of the non-display area NDA. The organic layer 150 may not be disposed in the pad area PDA of the non-display area NDA.

The organic layer 150 may include a color filter CF disposed in the display area DA, and a first dam pattern DP1 and a second dam pattern DP2 disposed in the non-display area NDA. The organic layer 150 may include a photosensitive organic material including a chromatic pigment. For example, the photosensitive organic material including the chromatic pigment may include any one of red, green, and blue pigments.

The color filter CF disposed in the display area DA may convert a color of light transmitting the color filter CF into a specific color. In an exemplary embodiment, the color filter CF may include a first color filter, a second color filter, and a third color filter. Each of the first color filter, the second color filter, and the third color filter may be any one of a red color filter, a green color filter, and a blue color filter. However, the inventive concepts are not limited thereto, and in some exemplary embodiments, at least two of the first to third color filters may be the same color filter. The color filter CF may be disposed to overlap the pixel electrode PXE in the third direction DR3.

The above described dam patterns DP may be formed in the organic layer 150 disposed in the border area BA of the non-display area NDA. The dam patterns DP disposed in the border area BA of the non-display area NDA may include a photosensitive organic material including a blue pigment. In particular, the dam patterns DP disposed in the border area BA may be formed of the same material as the blue color filter.

Referring back to FIG. 1, the dam patterns DP disposed in the border area BA of the non-display area NDA may be formed in a shape extending in a direction intersecting the data line DL, for example, in the first direction DR1 when viewed from above. In some exemplary embodiments, a dam pattern DP may have a stripe shape extending in a second direction DR2. The dam patterns DP disposed in the border area BA of the non-display area NDA will be described in detail below.

A capping layer CAP may be disposed on the organic layer 150. The capping layer CAP may be formed on substantially the entire organic layer 150, and may be disposed to extend to the border area BA of the non-display area NDA.

The capping layer CAP may include an inorganic insulator. For example, the capping layer CAP may include an inorganic insulator, such as silicon oxide, silicon nitride, or silicon oxynitride. The capping layer CAP may cover substantially the entire organic layer 150 to protect the organic layer 150.

An opening overlapping the opening formed in the first insulating layer 140 in the display area DA may be formed in the capping layer CAP in the display area DA. At a least part of the drain electrode DE may be exposed through the opening formed in the first insulating layer 140 in the display area DA and the opening formed in the capping layer CAP in the display area DA.

A second insulating layer 160 is disposed on the capping layer CAP. The second insulating layer 160 may reduce a step formed due to the thin film transistor Tr or the color filter CF. The second insulating layer 160 may be disposed on substantially the entirety of both of the display area DA and the non-display area NDA.

The second insulating layer 160 may be formed of a photosensitive organic insulator. A kind of the organic insulator is not particularly limited. The second insulating layer 160 may function as a planarization film having a predetermined thickness.

An opening overlapping the opening formed in the first insulating layer 140 in the display area DA and the opening formed in the capping layer CAP in the display area DA may be formed in the second insulating layer 160 in the display area DA. At least a part of the drain electrode DE may be exposed through the opening formed in the second insulating layer 160 in the display area DA. A first contact hole CNT1 exposing at least a part of the drain electrode DE may be formed through the openings formed in the first insulating layer 140, the capping layer CAP, and the second insulating layer 160 in the display area DA. The drain electrode DE is electrically connected to the pixel electrode PXE, which will be described below, through the first contact hole CNT1 which passes through the first insulating layer 140, the capping layer CAP, and the second insulating layer 160, and exposes at least a part of the drain electrode DE.

The second insulating layer 160 in the border area BA may be disposed on the dam patterns DP. The second insulating layer 160 in the border area BA of the non-display area NDA will be described in detail below.

An opening overlapping an opening formed in the first insulating layer 140 in the pad area PDA may be formed in the second insulating layer 160 in the pad area PDA. The opening formed in the second insulating layer 160 in the pad area PDA may expose at least a part of the data pad DP. A second contact hole CNT2 may be formed through the opening formed in the second insulating layer 160 in the pad area PDA and the opening formed in the first insulating layer 140 in the pad area PDA. The data pad DP is electrically connected to a pad connecting electrode PE through the second contact hole CNT2, which passes through the first insulating layer 140 and the second insulating layer 160 in the pad area PDA and exposes at least a part of the data pad DP.

The pixel electrode PXE positioned in each of the pixels PX may be disposed on the second insulating layer 160 in the display area DA. The pixel electrode PXE may be connected to the drain electrode DE through the first contact hole CNT1. The pixel electrode PXE may be formed of a transparent conductor. For example, the pixel electrode PXE may be formed of indium tin oxide (ITO) or indium zinc oxide (IZO).

The pad connecting electrode PE may be disposed on the second insulating layer 160 in the pad area PDA. The pad connecting electrode PE is a portion that electrically connects a driving circuit (for example, data driver) to the data pad DP, and may be connected to the data pad DP through the second contact hole CNT2. The pad connecting electrode PE may be formed of a transparent conductor. For example, the pixel electrode PXE may be formed of ITO or IZO.

The first orientation film 190 may be disposed on the pixel electrode PXE and the second insulating layer 160. The first orientation film 190 may be disposed in a part of the border area BA of the non-display area NDA in addition to the display area DA. The first orientation film 190 may not be disposed in the pad area PDA of the non-display area NDA. The first orientation film 190 may not overlap the data pad DP, the second contact hole CNT2, and the pad connecting electrode PE. Accordingly, the first orientation film 190 may be prevented from affecting the connecting electrode 173 or a peripheral driving circuit (for example, a data driver).

The first orientation film 190 disposed in the border area BA of the non-display area NDA will be described in detail below.

The first orientation film 190 may serve to determine an orientation of the liquid crystal layer 300 to orient the liquid crystal layer 300. The first orientation film 190 may be formed of polyimide, polyamic acid, polyamide, polyester, polyethylene, polyurethane, polystyrene, or the like. In an exemplary embodiment, the first orientation film 190 may be formed of the polyimide.

The second display substrate 200 may include a second substrate 210, a light blocking member BM, a third insulating layer 230, a common electrode CME, spacers 250, and a second orientation film 270.

The second display substrate 200 may be disposed in the display area DA and the border area BA of the non-display area NDA of the display device 1. The second display substrate 200 may not be disposed in the pad area PDA of the non-display area NDA of the display device 1. However, the inventive concepts are not limited thereto, and in some exemplary embodiments, the second display substrate 200 may be disposed to overlap at least a part of the pad area PDA.

The second substrate 210 may be an insulating substrate. The second substrate 210 may include a transparent material. For example, the second substrate 210 may include a transparent insulator, such as glass and quartz. However, the second substrate 210 is not limited thereto, and in some exemplary embodiments, the second substrate 210 may additionally or alternatively include plastic such as polyimide, and may have a flexible property in which the second substrate 210 is twistable, bendable, foldable, or rollable.

The second substrate 210 may include the same substrate as the first substrate 110, but a material, a thickness, a transmissivity, and the like of the second substrate 210 may be different from those of the first substrate 110. For example, the transmissivity of the second substrate 210 may be higher than that of the first substrate 110. The thickness of the second substrate 210 may also be greater or less than that of the first substrate 110.

The second substrate 210 is opposite to the first substrate 110 of the first display substrate 100. The light blocking member BM may be disposed on one surface of the second substrate 210 opposite to the first substrate 110 of the first display substrate 100. The light blocking layer 280 may be disposed in the display area DA and the border area BA of the non-display area NDA, in which an image is not displayed.

The light blocking member BM in the display area DA may be disposed along a border of the pixel PX. The light blocking member BM may be disposed at a position opposite to the first contact hole CNT1 of the first display substrate 100. The light blocking member BM in the display area DA may include an opening exposing at least a part of the second substrate 210. The light blocking member BM of the display area DA may be positioned in a non-light emitting area to prevent light from leaking from the first contact hole CNT1. The light blocking member BM may be formed in a grid shape when viewed from above.

The light blocking member BM in the border area BA of the non-display area NDA may be disposed on substantially one entire surface of the second substrate 210. Accordingly, the light blocking member BM in the non-display area NDA may prevent light from leaking from the non-display area NDA.

The light blocking member BM may be formed of an organic polymer material including a black dye or pigment. In addition, the light blocking member BM may include a photosensitive material. The light blocking member BM may absorb external light to reduce distortion of color due to reflection of the external light. In addition, the light blocking member BM may prevent light from being incident onto the adjacent pixel PX, or to prevent light from being emitted from the non-display area NDA.

The third insulating layer 230 may be disposed on the light blocking member BM and the second substrate 210 exposed through the light blocking member BM. The third insulating layer 230 may include an organic or inorganic insulator. The third insulating layer 230 may have a sufficient thickness to cancel out a step formed due to the light blocking member BM.

The common electrode CME may be disposed on the third insulating layer 230. The common electrode CME may be disposed in the border area BA of the non-display area NDA in addition to the display area DA.

The common electrode CME in the display area DA may be formed across the pixels PX. The common electrode CME of the display area DA may be an electrode disposed on substantially the entire surface without distinguishing the pixels PX. The common electrode CME may be formed of a transparent conductor, such as ITO or IZO.

The spacers 250 may be disposed on the common electrode CME. The spacers 250 may be disposed in the display area DA and the border area BA of the non-display area NDA.

The spacers 250 may protrude toward the first display substrate 100, and are in contact with first display substrate 100 to maintain a cell gap between the second display substrate 200 and the first display substrate 100. Each of the spacers 250 may be formed of an organic insulator, and may also have a photosensitive property.

The spacer 250 of the display area DA may be disposed to overlap the light blocking member BM. The spacer 250 may be disposed to overlap the thin film transistor Tr of the first display substrate 100. Since the spacer 250 is disposed to overlap the thin film transistor Tr of the first display substrate 100, a size of the light blocking member BM can be relatively decreased and an aperture of the display device 1 can be improved. The spacer 250 in the display area DA may be a column spacer.

In some exemplary embodiments, the spacer 250 in the display area DA may include a first spacer and a second spacer having different heights from each other. The first spacer may uniformly maintain a gap between the first substrate 110 and the second substrate 210. The second spacer may be disposed to be spaced apart from the first spacer, and may be formed to have a height less than the height of the first spacer. In this manner, when an external force is applied to the display device 1, the second spacer may distribute a pressure which may otherwise be concentrated to the first spacer.

The spacer 250 in the border area BA of the non-display area NDA may maintain the cell gap in the non-display area NDA, and to prevent the liquid crystal layer 300 from moving toward the sealing member SLP which will be described below. More particularly, since the spacer 250 in the border area BA is disposed between the liquid crystal layer 300 and the sealing member SLP to prevent the liquid crystal layer 300 from moving toward the sealing member SLP, the spacer 250 may reduce a delamination defect which may occur when the sealing member SLP is contaminated from the liquid crystal layer 300, or to reduce a mura defect which may occur when the display area DA is not filled with a liquid crystal.

The spacers 250 in the border area BA of the non-display area NDA and the spacer 250 in the display area DA may be simultaneously formed through the same process.

The second orientation film 270 may be disposed on the spacers 250 and the common electrode CME. The second orientation film 270 may be disposed in the display area DA, and in at least a part of the border area BA of the non-display area NDA.

The sealing member SLP is formed in the border area BA of the display device 1 along a periphery of the display area DA to surround the display area DA. Accordingly, the first display substrate 100 and the second display substrate 200 are coupled through the sealing member SLP, and in addition, a predetermined space may also be defined between the first display substrate 100 and the second display substrate 200. Since the liquid crystal layer 300 is disposed in the defined space, the liquid crystal molecules are prevented from leaking to the outside.

The sealing member SLP may overlap at least one spacer 250 disposed in the border area BA of the non-display area NDA and the color pattern 150.

The liquid crystal layer 300 may be surrounded by the sealing member SLP. The liquid crystal layer 300 may be disposed in substantially the entire display area DA and may extend to be disposed in at least a part of the border area BA of the non-display area NDA. The liquid crystal layer may include reactive liquid crystal molecules and reactive monomers.

Figure 6:
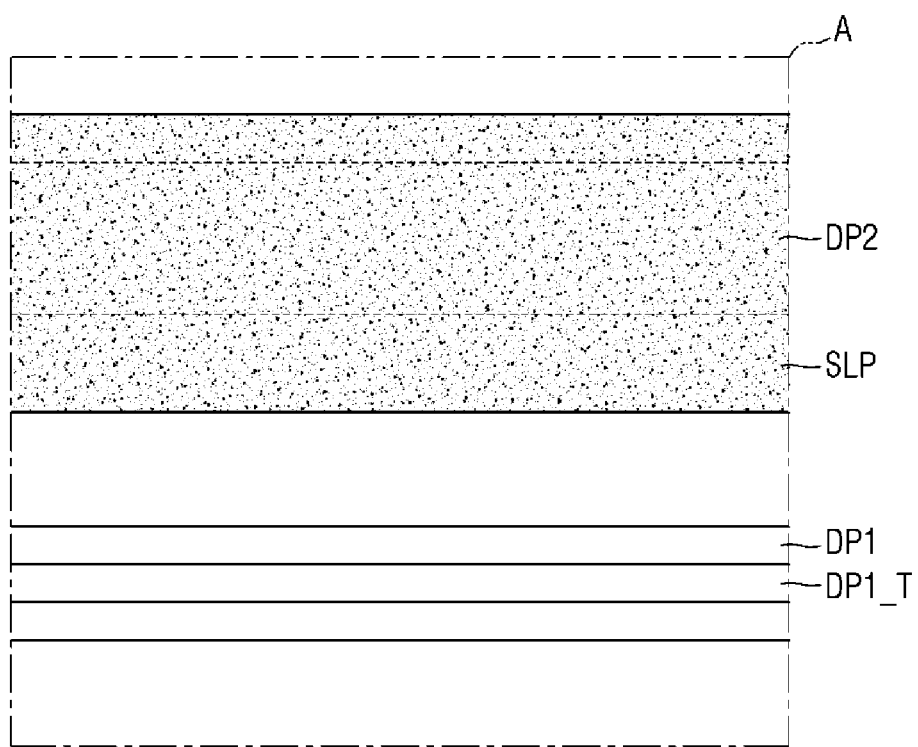
FIG. 6 is an enlarged view illustrating region A of FIG. 1 according to an exemplary embodiment.
Figure 7:
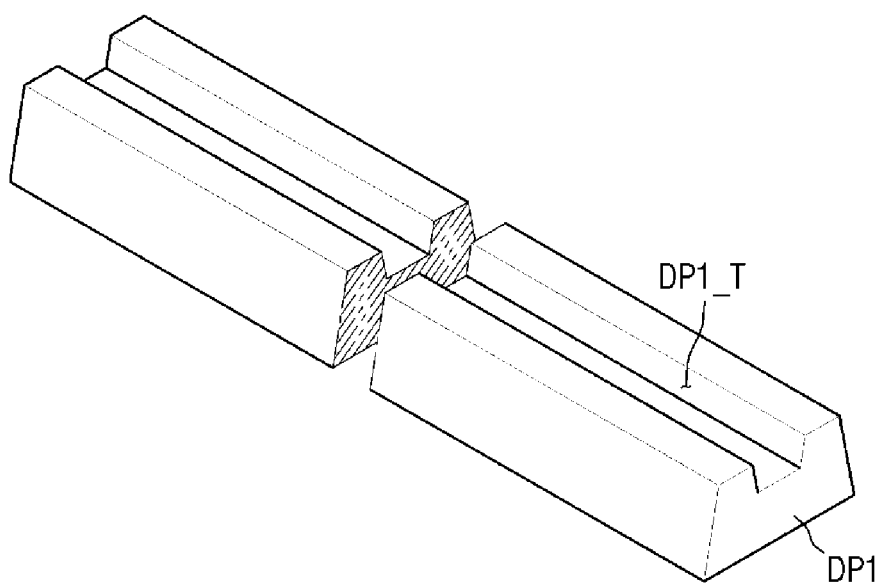
FIG. 7 is a perspective view of a first dam pattern according to an exemplary embodiment.
Figure 8:
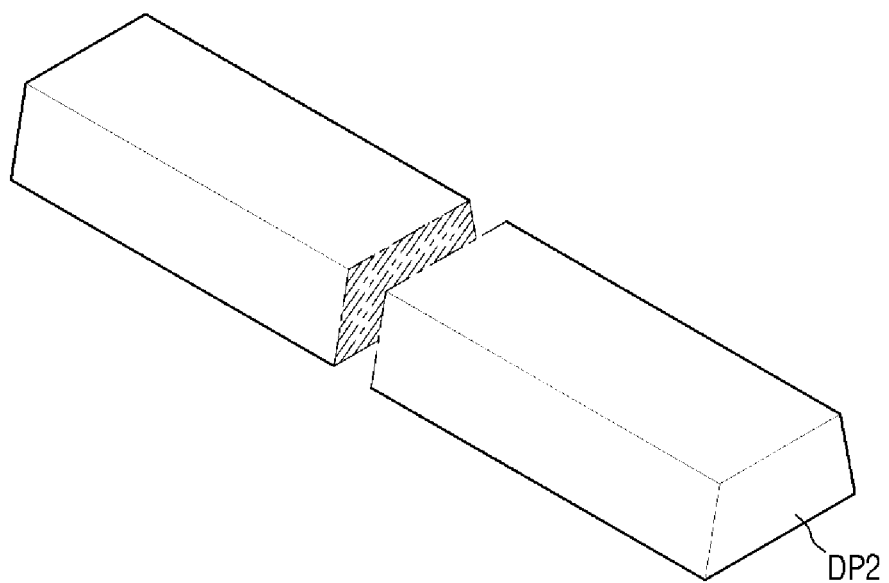
FIG. 8 is a perspective view of a second dam pattern according to an exemplary embodiment.
Figure 9:
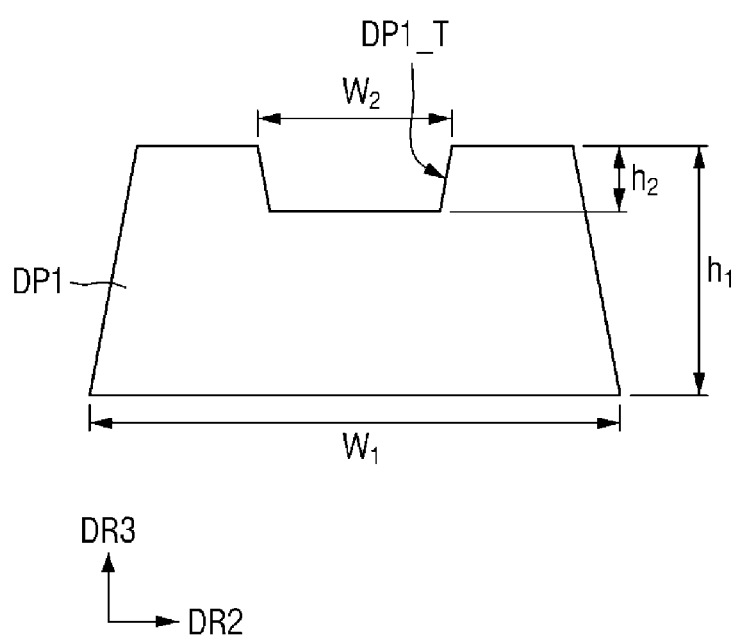
FIG. 9 is a cross-sectional view illustrating the first dam pattern.

Hereinafter, a layout of the border area BA of the non-display area NDA will be described in detail. FIG. 6 is an enlarged view of region A of FIG. 1 according to an exemplary embodiment. FIG. 7 is a perspective view illustrating a first dam pattern according to an exemplary embodiment. FIG. 8 is a perspective view illustrating a second dam pattern according to an exemplary embodiment. FIG. 9 is a cross-sectional view illustrating the first dam pattern. Hereinafter, the organic layer 150 disposed in the border area BA of the non-display area NDA may also be referred to as the dam patterns DP1 and DP2.

Referring to FIGS. 5 to 9, the dam patterns DP disposed in the border area BA of the non-display area NDA may include the first dam pattern DP1 and the second dam pattern DP2. The sealing member SLP may be disposed in the border area BA of the non-display area NDA. Hereinafter, a dam pattern disposed to overlap the sealing member SLP is defined as the second dam pattern DP2, and a dam pattern disposed to not overlap the sealing member SLP is defined as the first dam pattern DP1.

The first dam pattern DP1 and the second dam pattern DP2 may be formed to extend from the border area BA in a longitudinal direction. For example, the first dam pattern DP1 and the second dam pattern DP2 may have forms extending in the first direction DR1. However, the inventive concepts are not limited thereto, and in some exemplary embodiments, the dam patterns DP may extend in the first direction DR1 according to their respective positions. The first dam pattern DP1 and the second dam pattern DP2 may be disposed to be spaced apart from each other in the second direction DR2.

The first dam pattern DP1 may be disposed under the border area BA when viewed from above (e.g., a side in an opposite direction of the second direction DR2). The second dam pattern DP2 may be disposed above the first dam pattern DP1 (e.g., a side in the second direction DR2). More particularly, the first dam pattern DP1 may be disposed at a side of the display area DA in the border area BA, that is, an inner side of the border area BA, and the second dam pattern DP2 may be disposed at a side opposite to the display area DA in the border area BA, that is, an outer side of the border area BA opposite to the display area DA.

The sealing member SLP is disposed to overlap the second dam pattern DP2 in the border area BA to cover substantially the entire second dam pattern DP2. Accordingly, an area of the sealing member SLP may be greater than an area of the second dam pattern DP2 when viewed from above.

The sealing member SLP may be disposed to expose the first dam pattern DP1 in the third direction DR3. More particularly, the sealing member SLP may be disposed on substantially the entire second dam pattern DP2, and may be disposed on at least a part of a separation space between the first dam pattern DP1 and the second dam pattern DP2.

In an exemplary embodiment, the first dam pattern DP1 and the second dam pattern DP2 may have different forms.

The second dam pattern DP2 may include an upper surface, a lower surface, and side surfaces. The lower surface of the second dam pattern DP2 is disposed on the first insulating layer 140. The upper surface of the second dam pattern DP2 is opposite to the lower surface of the second dam pattern DP2. The upper surface and the lower surface of the second dam pattern DP2 may be positioned on respective planes, and since the plane on which the upper surface is positioned and the plane on which the lower surface is positioned are substantially parallel to each other, the second dam pattern DP2 may have a substantially uniform thickness. The side surfaces of the second dam pattern DP2 may form acute angles with the upper surface and/or lower surface of the second dam pattern DP2.

The first dam pattern DP1 may include an upper surface, a lower surface, and side surfaces. The lower surface of the first dam pattern DP1 is disposed on the first insulating layer 140. The lower surface of the first dam pattern DP1 may be positioned on one plane.

The first dam pattern DP1 may include a first trench DP1_T in a surface of the first dam pattern DP1. The first trench DP1_T may be formed in the upper surface of the first dam pattern DP1. The first trench DP1_T formed in the first dam pattern DP1 may have a form extending in a direction in which the first dam pattern DP1 extends. For example, when the first dam pattern DP1 extends in the first direction DR1, the first trench DP1_T of the first dam pattern DP1 may also extend in the first direction DR1.

The first trench DP1_T formed in the first dam pattern DP1 may include a lower surface and sidewalls extending upward from the lower surface. The lower surface of the first trench DP1_T formed in the first dam pattern DP1 may be substantially parallel to the lower surface of the first dam pattern DP1. The lower surface of the first trench DP1_T formed in the first dam pattern DP1 may form a part of the upper surface of the first dam pattern DP1, and the sidewalls of the first trench DP1_T formed in the first dam pattern DP1 may form inner surfaces of the first dam pattern DP1.

Since the first trench DP1_T is formed in the first dam pattern DP1, the first dam pattern DP1 may have a surface step with a different thickness. Accordingly, the thickness of a region in which the first trench DP1_T is formed in the first dam pattern DP1 may be different from the thickness of a region in which the first trench DP1_T is not formed in the first dam pattern DP1. The thickness of the first dam pattern DP1 where the first trench DP1_T is not formed may be greater than the thickness of the first dam pattern DP1 formed with the first trench DP1_T.

A width W2 of the first trench DP1_T formed in the first dam pattern DP1 in the second direction DR2 may be less than a width W1 of the first dam pattern DP1 in the second direction DR2. In an exemplary embodiment, the width W1 of the first dam pattern DP1 in the second direction DR2 may range from about 30 μm to about 35 μm, and the width W2 of the first trench DP1_T formed in the first dam pattern DP1 in the second direction DR2 may range from about 5 μm to about 7 μm, but the inventive concepts are not limited thereto.

A height h2 of the first trench DP1_T formed in the first dam pattern DP1 may be less than a thickness h1 of the region in which the first trench DP1_T is not formed in the first dam pattern DP1. The thickness of the first dam pattern DP1 in the region in which the first trench DP1_T is formed may be the same as a difference between the thickness h1 of the region in which the first trench DP1_T is not formed in the first dam pattern DP1 and the height h2 of the first trench DP1_T. In an exemplary embodiment, the thickness h1 of the region in which the first trench DP1_T is not formed in the first dam pattern DP1 may range from about 2.2 μm to 3.0 about μm, and the height h2 of the first trench DP1_T formed in the first dam pattern DP1 may range from about 0.3 μm to about 0.5 μm, without being limited thereto.

As described above, the gate insulating layer 130 and the first insulating layer 140 are disposed on substantially the entire first substrate 110 in the border area BA of the non-display area NDA. The first dam pattern DP1 and the second dam pattern DP2 may be disposed to be spaced apart from each other on the first insulating layer 140.

Each of the first dam pattern DP1 and the second dam pattern DP2 may be any one of a red color filter, a green color filter, and a blue color filter. In the illustrated exemplary embodiment, each of the first dam pattern DP1 and the second dam pattern DP2 may be the blue color filter. However, the inventive concepts are not limited thereto, and in some exemplary embodiments, the first dam pattern DP1 and the second dam pattern DP2 may be formed as different color filters. For example, the first dam pattern DP1 may be the blue color filter, and the second dam pattern DP2 may be the red color filter. Hereinafter, the first dam pattern DP1 and the second dam pattern DP2 will be described as including the blue color filters, which may include blue photosensitive resin compositions that have high thermal flowability. In this manner, in the first dam pattern DP1 and the display device 1 manufactured using the blue photosensitive resin composition, pattern straightness and a reverse taper may not occur. Furthermore, an afterimage may not be displayed when a panel operates as generation of outgassing may be suppressed during a manufacturing process. Moreover, an effect of preventing reflection may be high, and thus, an image quality, heat resistance, chemical resistance, durability, and reliability may be improved.

The capping layer CAP may be disposed on the first dam pattern DP1 and the second dam pattern DP2. The capping layer CAP may be disposed on the entire second dam pattern DP2 and the entire first insulating layer 140 to cover substantially the entire second dam pattern DP2 and the entire first insulating layer 140.

The capping layer CAP is disposed on the first dam pattern DP1, but may not be disposed on the first trench DP1_T formed in the first dam pattern DP1. More particularly, a trench may be formed in the capping layer CAP to overlap the first trench DP1_T formed in the first dam pattern DP1. The trench of the capping layer CAP may be formed to overlap the first trench DP1_T formed in the first dam pattern DP1 to expose at least a part of the first dam pattern DP1.

The second insulating layer 160 is disposed on the capping layer CAP. The second insulating layer 160 may be disposed on substantially the entire capping layer CAP. The second insulating layer 160 is disposed on the first dam pattern DP1, but may not be formed in a region in which the second insulating layer 160 overlaps the first trench DP1_T formed in the first dam pattern DP1. More particularly, a trench may be formed in the second insulating layer 160 to overlap the first trench DP1_T formed in the first dam pattern DP1 and the trench of the capping layer CAP. The trench of the second insulating layer 160, the trench of the capping layer CAP, and the first trench DP1_T formed in the first dam pattern DP1 may form a trench structure TR.

The first orientation film 190 is disposed on the second insulating layer 160. The first orientation film 190 may be disposed to expose at least a part of the second insulating layer 160. The first orientation film 190 may be disposed on at least a part of the first trench DP1_T of the first dam pattern DP1. In the drawings, the first orientation film 190 is illustrating as being disposed on the trench structure TR, disposed over the second insulating layer 160, and disposed on an upper surface of the second insulating layer 160, but the inventive concepts are not limited thereto. For example, in some exemplary embodiments, the first orientation film 190 may be disposed on the trench structure TR and may not fully cover the second insulating layer 160.

Since the first dam pattern DP1 forms a high step, the first orientation film 190 having a liquid form may be disposed only on at least a part of the first dam pattern DP1, and may not be disposed on the second dam pattern DP2. In addition, the first orientation film 190 may be disposed on at least a part of the trench structure TR, and may not overlap the sealing member SLP due to the first trench DP1_T formed in the upper surface of the first dam pattern DP1. Accordingly, the first dam pattern DP1 and the first trench DP1_T included in the first dam pattern DP1 may function as a dam, which prevents the first orientation film 190 from overflowing toward the sealing member SLP.

The sealing member SLP may be disposed on the second insulating layer 160 exposed through the first orientation film 190. The sealing member SLP may be disposed to overlap the second dam pattern DP2 as described above. The sealing member SLP may be disposed to be spaced apart from the first orientation film 190 of the first display substrate 100 on the second insulating layer 160. When the sealing member SLP overlaps an inorganic film or the first orientation film 190, coupling performance may be reduced. The first dam pattern DP1 may prevent the first orientation film 190 from overflowing and extending to the sealing member SLP.

Hereinafter, a method of manufacturing the display area DA and the border area BA of the non-display area NDA of the first display substrate 100 will be described.

FIGS. 10 to 15 are cross-sectional views illustrating a method of manufacturing a first display panel according to an exemplary embodiment.

Figure 10:
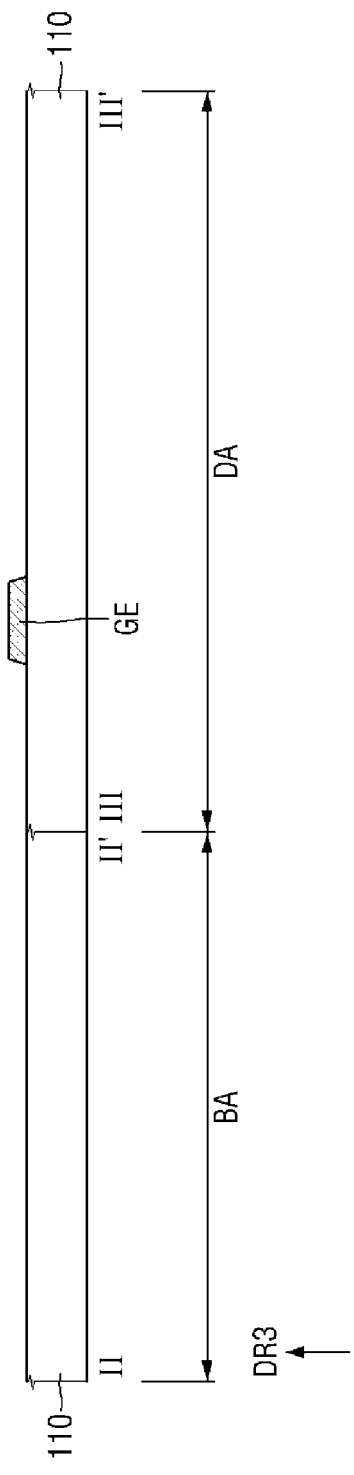
FIGS. 10, 11, 12, 13, 14, and 15 are cross-sectional views illustrating a method of manufacturing a first display panel according to an exemplary embodiment.

First, referring to FIG. 10, the patterned gate electrode GE is formed on the first substrate 110. The patterned gate electrode GE may be formed through a mask process. For example, after a gate electrode material layer is formed on substantially the entire first substrate 110, the gate electrode material layer may be patterned to form the gate electrode GE illustrated in FIG. 9 through a photolithograph process or the like.

Figure 11:
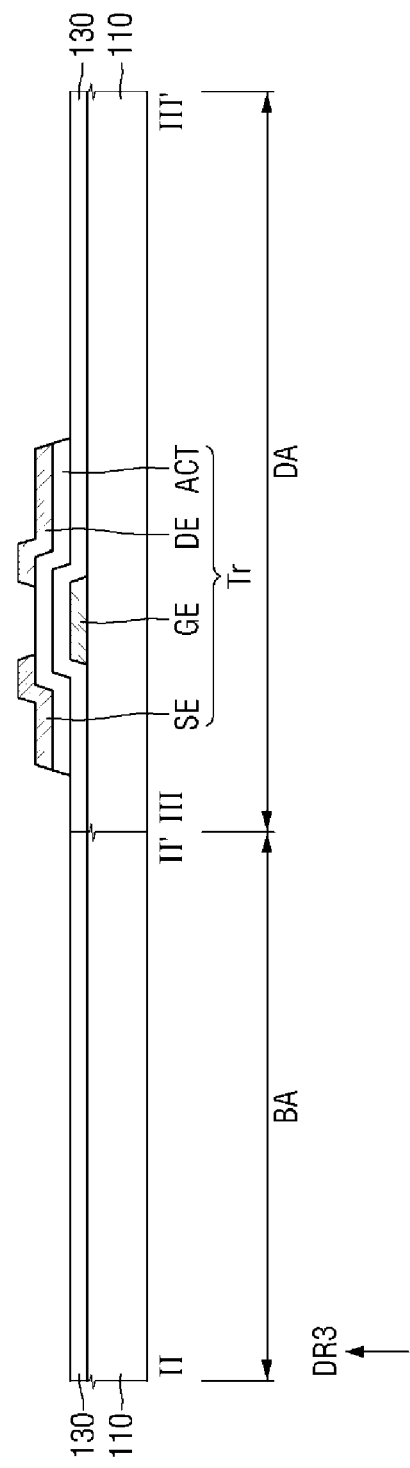

Then, referring to FIG. 11, the gate insulating layer 130 is formed on substantially the entire first substrate 110 on which the gate electrode GE is formed. Then, the semiconductor layer ACT, the source electrode SE, and the drain electrode DE are formed on the gate insulating layer 130. The semiconductor layer ACT may be formed through a mask process. For example, after an oxide semiconductor is deposited on the gate insulating layer 130, the oxide semiconductor may be patterned to form the semiconductor layer ACT illustrated in FIG. 10 through a photolithograph process. Then, the source electrode SE and the drain electrode DE are formed on the semiconductor layer ACT. The source electrode SE and the drain electrode DE may be formed through a mask process. For example, after a conductor layer is formed on the semiconductor layer ACT, the conductor layer is patterned to form the source electrode SE and the drain electrode DE illustrated in FIG. 10 through a photolithograph process or the like.

Figure 12:
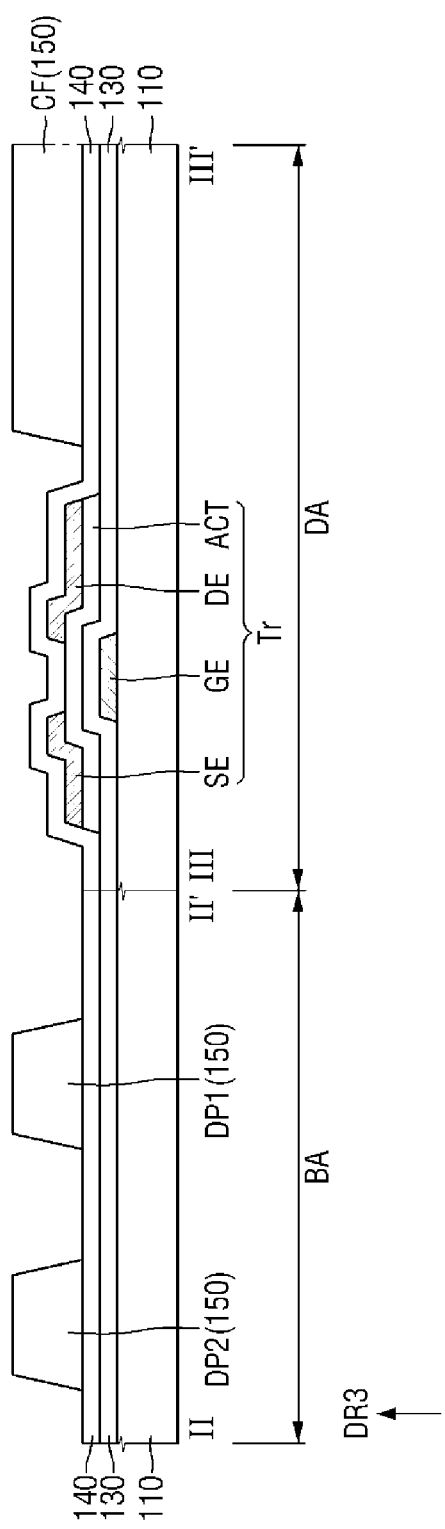

Then, referring to FIG. 12, the first insulating layer 140 is formed on the gate insulating layer 130, on which the source electrode SE and the drain electrode DE are formed. Then, the patterned organic layer 150 is formed on the first insulating layer 140. The organic layer 150 may be formed through a mask process. For example, after a photosensitive organic material including a chromatic pigment covers the display area DA and the border area BA of the first insulating layer 140, the patterned organic layer 150 is formed through exposure and development processes.

Figure 13:
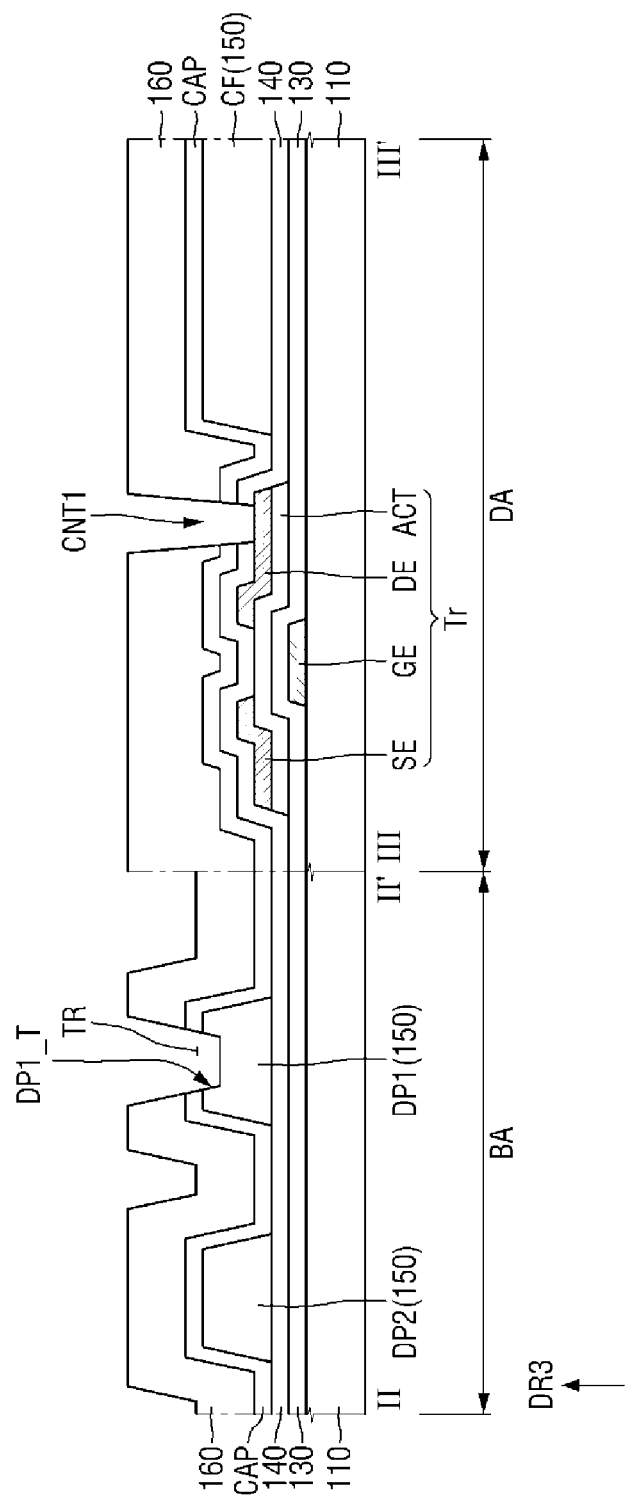

Then, referring to FIG. 13, the capping layer CAP and the second insulating layer 160 are sequentially stacked on the patterned organic layer 150, and the first contact hole CNT1 exposing a part of the drain electrode DE disposed in the display area DA and the trench structure TR disposed in the border area BA are formed. The first contact hole CNT1 and the trench structure TR may be formed through the same mask process. For example, a material layer for the capping layer CAP and a material layer for the second insulating layer 160 are sequentially deposited on the patterned organic layer 150 and the first insulating layer 140 exposed through the patterned organic layer 150. Then, a photoresist pattern which exposes a part of the drain electrode DE and a part of the first dam pattern DP1 disposed in the border area BA is formed on the material layer for the second insulating layer 160, and the second insulating layer 160 and the capping layer CAP are etched to form the first contact hole CNT1 and the trench structure TR using the photoresist pattern as an etching mask. Through this process, a part of the capping layer CAP and a part of the first dam pattern DP1 disposed on the first dam pattern DP1 may react with an etching material to generate gas. Accordingly, by discharging the gas that may be generated from the first dam pattern DP1 in advance, gas generation that may otherwise occur from the first trench DP1_T formed in the first dam pattern DP1 in subsequent process may be obviated. The gas generated from the first dam pattern DP1 may be carbon monoxide (CO), for example.

As described above, according to the illustrated exemplary embodiment, the gas which may be generated from the first dam pattern DP1 may be generated and removed in advance in the process of forming the contact hole CNT1 and the trench structure TR formed on the second insulating layer 160. More particularly, when the display device 1 is used, outgassing may occur from the first dam pattern DP1 due to light provided from the backlight unit 30. Since the gas, which may be generated from the first dam pattern DP1, is generated in advance and is removed, mura defects that may otherwise be generated due to generation of the gas may be prevented.

Figure 14:
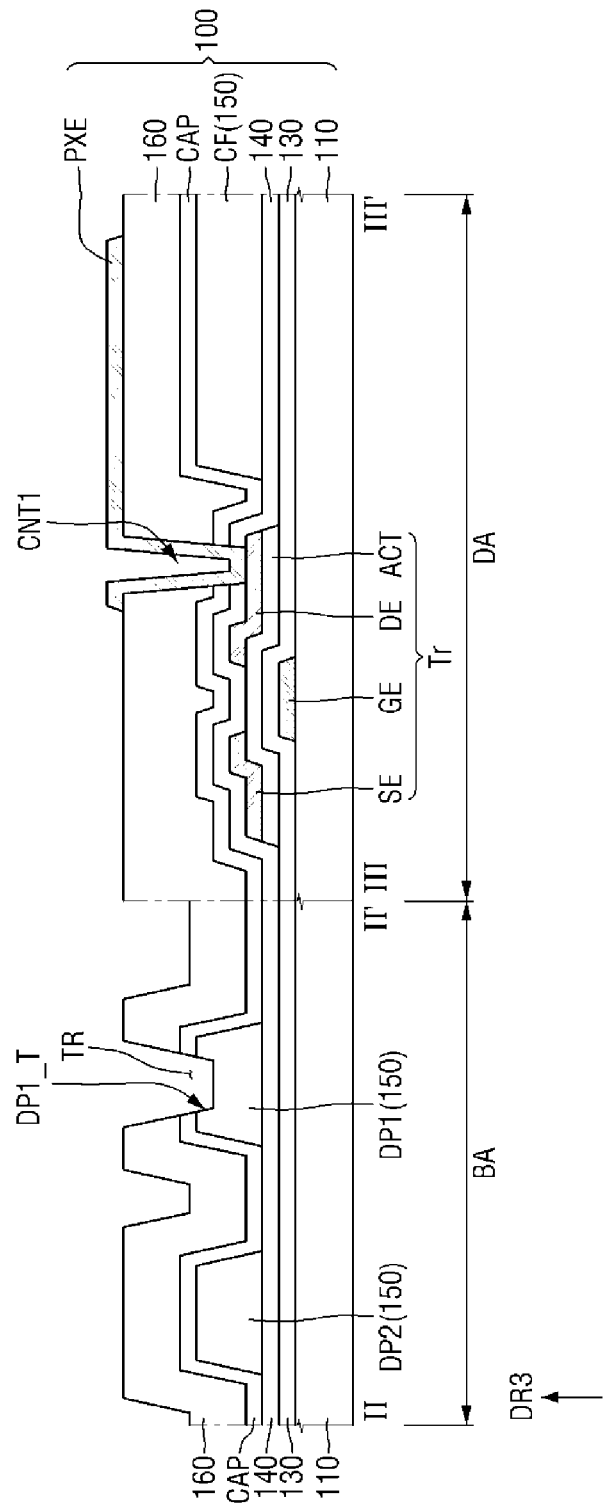

Then, referring to FIG. 14, the patterned pixel electrode PXE is formed on the second insulating layer 160. The patterned pixel electrode PXE may be formed through a mask process. More particular, a material layer for a pixel electrode PXE is deposited on the second insulating layer 160. In the deposition process, the material layer for the pixel electrode PXE may be deposited inside the first contact hole CNT1 to be connected to the drain electrode DE.

Then, the material layer for the pixel electrode PXE is coated with a photoresist layer, and a photoresist pattern having a pattern form of the pixel electrode PXE is formed through exposure and development processes. Then, the material layer for the pixel electrode PXE is etched using the photoresist pattern as an etching mask. The etching of the material layer for the pixel electrode PXE is not limited thereto, and in some exemplary embodiments, a wet etching may be performed for the etching process.

Figure 15:
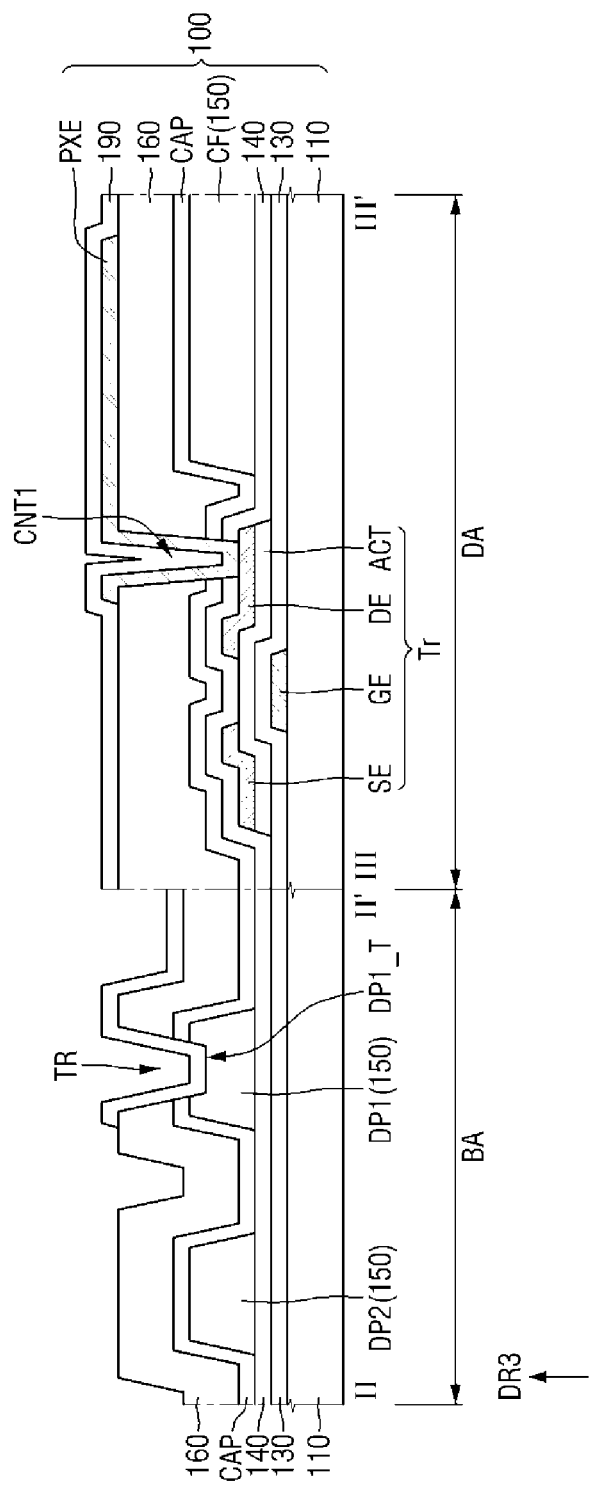

Then, referring to FIG. 15, the second insulating layer 160 on which the patterned pixel electrode PXE is formed is coated with an orientation liquid. The orientation liquid may be applied to substantially the entire display area DA through a method of inkjet printing, nozzle printing, or the like. The orientation liquid applied to the display area DA may spread beyond an outer side of the display area DA to the first dam pattern DP1 in the border area BA. In this case, the orientation liquid may be disposed inside the trench structure TR in the border area BA. Then, the orientation liquid is dried to form the first orientation film 190.

Hereinafter, a display device according to another exemplary embodiment will be described. In the following descriptions, repeated descriptions of the same components described above will be omitted or simplified, and different features thereof will be mainly described.

Figure 16:
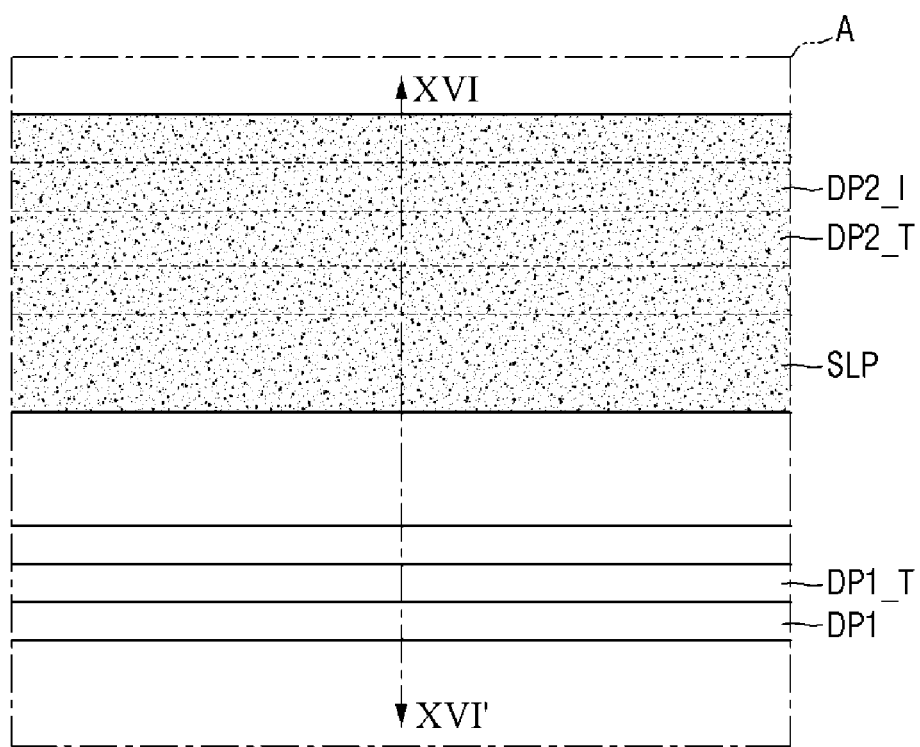
FIG. 16 is an enlarged view illustrating region A of FIG. 1 according to another exemplary embodiment.
Figure 17:
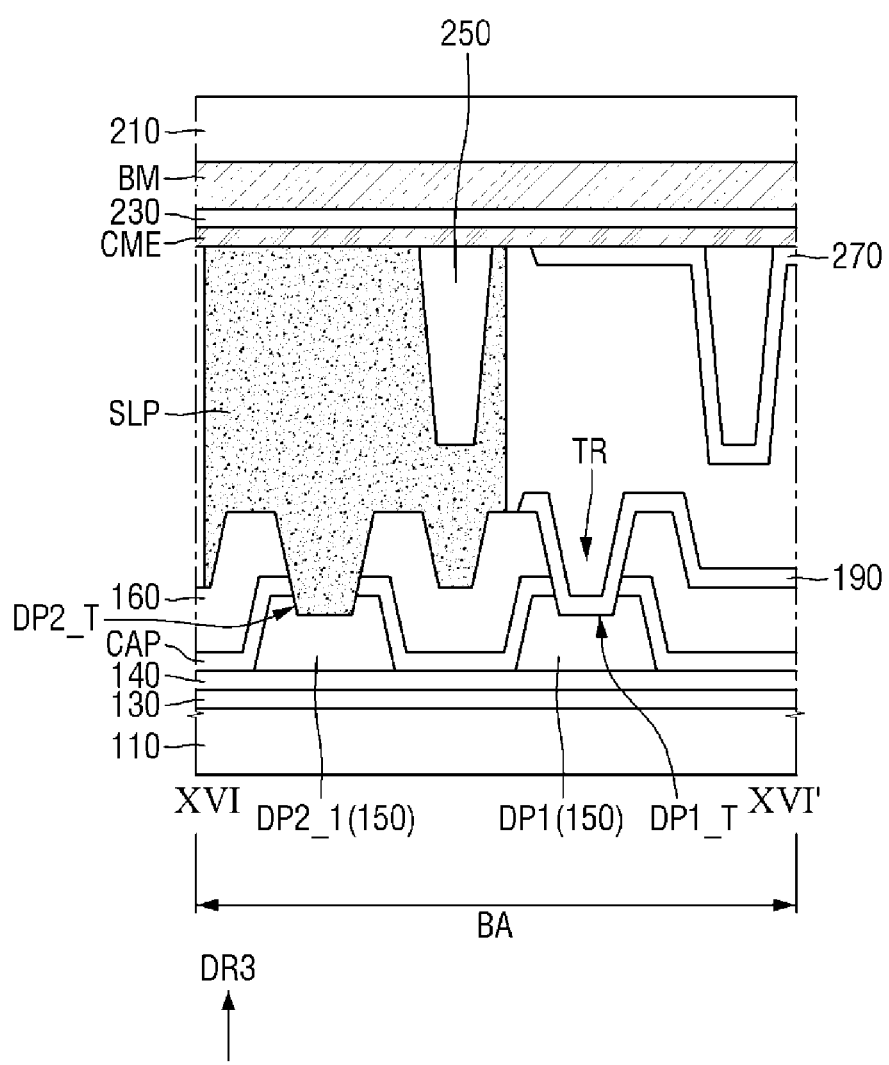
FIG. 17 is a cross-sectional view taken along line XVI-XVI' of FIG. 16.

FIG. 16 is an enlarged view of region A of FIG. 1 according to another exemplary embodiment. FIG. 17 is a cross-sectional view taken along line XVI-XVI' of FIG. 16.

Referring to FIGS. 16 and 17, a display device according to the illustrated exemplary embodiment differs from that shown in FIGS. 4 and 8, in that the form of a second dam pattern DP2_1 is substantially the same as the form of a first dam pattern DP1.

More particularly, a second trench DP2_T may be formed in the second dam pattern DP2_1 according to the illustrated exemplary embodiment. The second trench DP2_T formed in a second dam pattern DP2 may have a form extending in a direction in which the second dam pattern DP2 extends. For example, when the second dam pattern DP2 has the form extending in a first direction DR1, the second trench DP2_T of the second dam pattern DP2 may also have a form extending in the first direction DR1.

The form of the second trench DP2_T formed in the second dam pattern DP2_1 may be substantially the same as the form of a first trench DP1_T described above. Accordingly, the second trench DP2_T formed in the second dam pattern DP2 may include a lower surface and sidewalls extending upward from the lower surface. A width of the second trench DP2_T formed in the second dam pattern DP2 in a second direction DR2 may be substantially the same as a width W2 of the first trench DP1_T formed in the first dam pattern DP1 in the second direction DR2, and a height of the second trench DP2_T may be substantially the same as a height h2 of the first trench DP1_T.

The first dam pattern DP1 and the second dam pattern DP2_1 may be formed through the same process. Accordingly, as described above, an opening may be formed in a region of a capping layer CAP and a second insulating layer 160 overlapping the second trench DP2_T formed in the second dam pattern DP2_1. The opening formed in the region overlapping the second trench DP2_T may expose at least a part of the second dam pattern DP2_1. In the illustrated exemplary embodiment, at least a part of a sealing member SLP_1 disposed on the second dam pattern DP2 may be in contact with at least a part of an upper surface of the second dam pattern DP2_1 through the opening formed in the region overlapping the second trench DP2_T.

Figure 18:
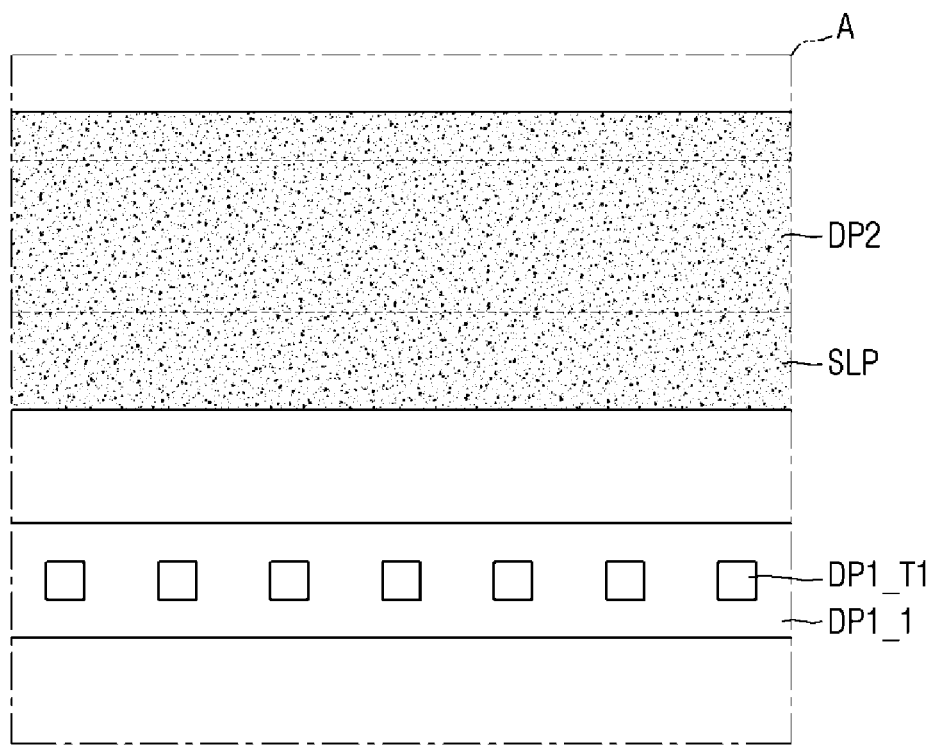
FIG. 18 is an enlarged view region A of FIG. 1 according to another exemplary embodiment.
Figure 19:
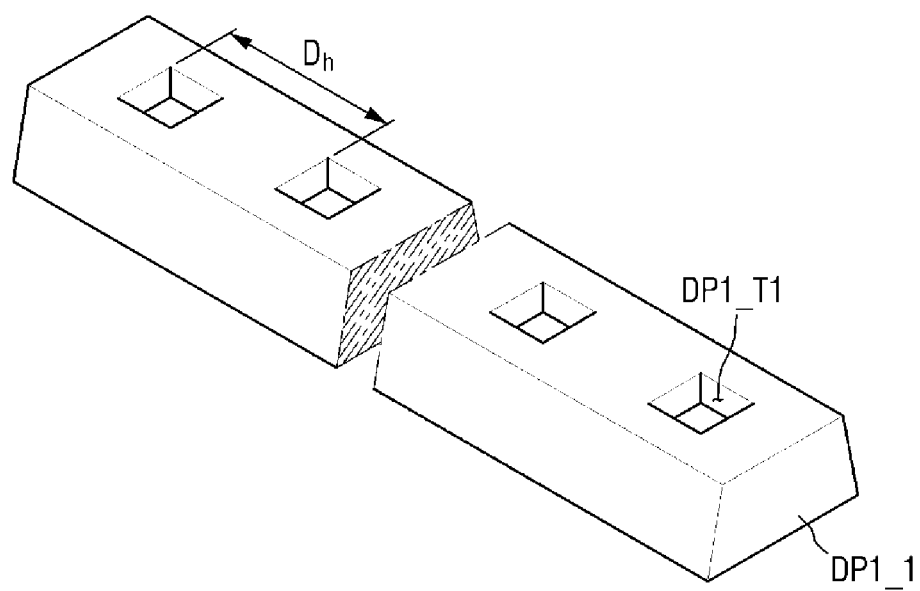
FIG. 19 is a perspective view illustrating a first dam pattern of FIG. 18.

FIG. 18 is an enlarged view of region A of FIG. 1 according to still another exemplary embodiment. FIG. 19 is a perspective view illustrating a first dam pattern of FIG. 18.

Referring to FIGS. 18 and 19, a display device according to the illustrated exemplary embodiment differs from that shown in FIG. 4, in that a plurality of first trenches DP1_T1 are formed in a first dam pattern DP1_1.

More particularly, the plurality of first trenches DP1_1 may be formed in the first dam pattern DP1_1 according to the illustrated exemplary embodiment. The plurality of first trenches DP1_T1 formed in the first dam pattern DP1_1 may be disposed to be spaced apart from each other.

The first dam pattern grooves DP1_T1 may have substantially rectangular shapes having the same area when viewed from above. However, the inventive concepts are not limited thereto, and in some exemplary embodiments, the first dam pattern grooves DP1_T1 formed in the first dam pattern DP1_1 may have square or circular shapes or the like when viewed from above, and areas of the first dam pattern grooves DP1_T1 may be different from each other when viewed from above.

The first dam pattern grooves DP1_T1 may be formed to be spaced apart from each other. The plurality of first dam pattern grooves DP1_T1 may be formed to be spaced apart from each other at a predetermined distance in a first direction DR1. The distances Dh between the first dam pattern grooves DP1_T1 disposed adjacent to each other may be the same. In the illustrated exemplary embodiment, the distances Dh between the first dam pattern grooves DP1_T1 disposed adjacent to each other in the first direction DR1 may be the same as distances between pixels PX disposed adjacent to each other in the first direction DR1. However, the inventive concepts are not limited thereto, and in some exemplary embodiments, the distance Dh between the first dam pattern grooves DP1_1 disposed adjacent to each other and formed in the first dam pattern DP1_1 may be greater than the distance between the pixels PX disposed adjacent to each other (e.g., a pitch of the pixel.)

Figure 20:
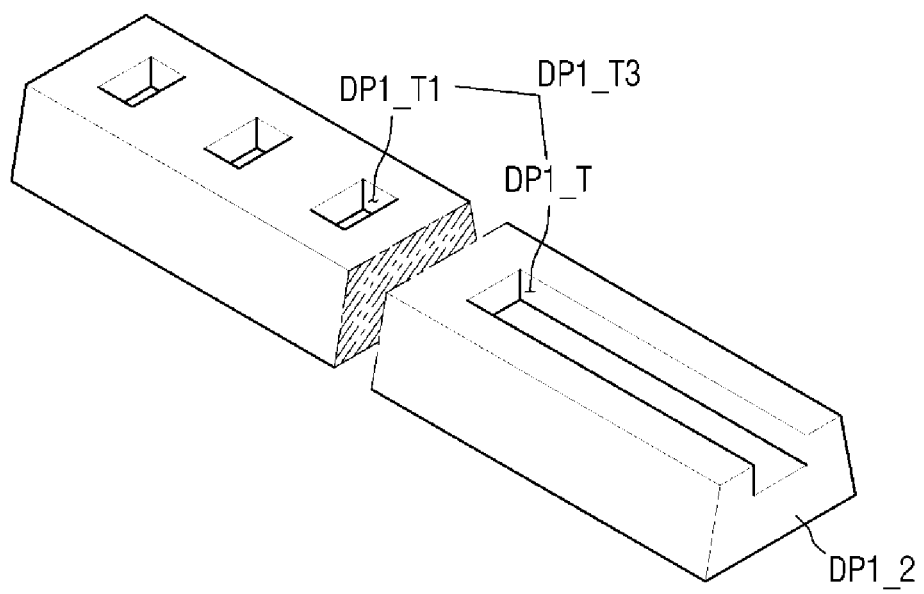
FIG. 20 is a perspective view illustrating a first dam pattern according to another exemplary embodiment.

FIG. 20 is a perspective view illustrating a first dam pattern according to another exemplary embodiment.

Referring to FIG. 20, first trenches DP1_3 formed in a first dam pattern DP1_3 according to the illustrated exemplary embodiment may have a structure in which different patterns of the first trench described above are complexly disposed.

More particularly, a first trench DP1_T may be formed at a side of a first dam pattern DP1_3 in a form extending in a first direction DR1, and a plurality of first trenches DP1_T1 may be formed at the other side of the first dam pattern DP1_3 to be spaced apart from each other at a predetermined distance in the first direction DR1. In this manner, the first trenches DP1_T3 formed in the first dam pattern DP1_3 according to the illustrated exemplary embodiment may have the complex structure, in which the first trench DP1_T of FIG. 5 and the first trenches DP1_T1 of FIG. 18 are formed.

Figure 21:
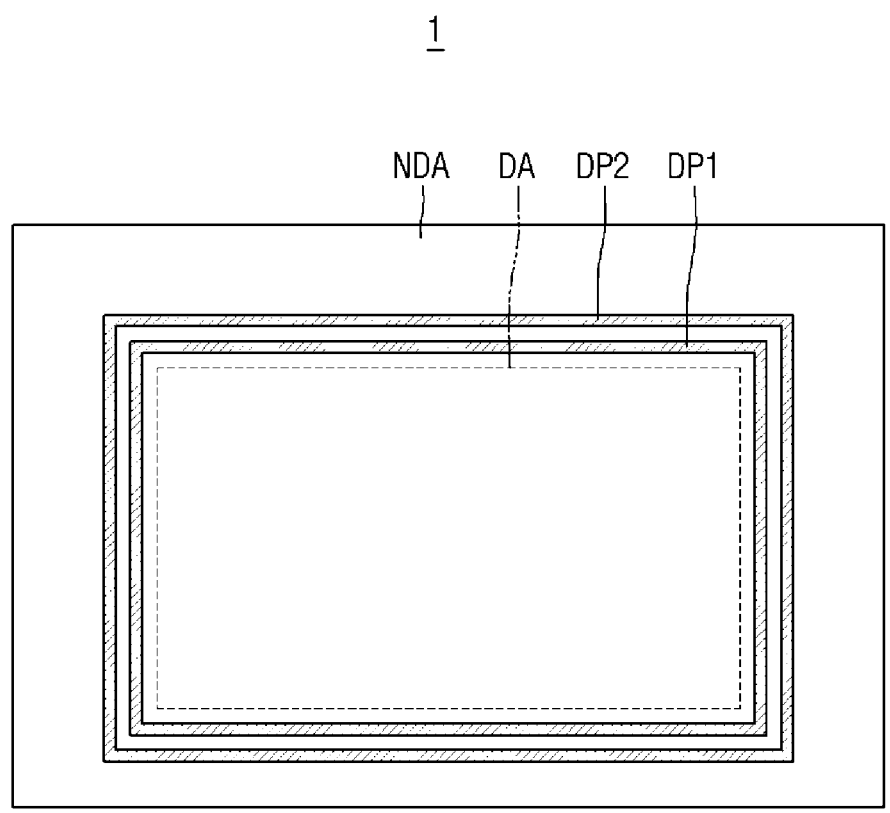
FIG. 21 is a plan view illustrating a display device according to another exemplary embodiment.
Figure 21:
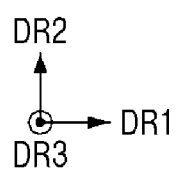

FIG. 21 is a plan view illustrating a display device according to another exemplary embodiment.

Referring to FIG. 21, the display device according to the illustrated exemplary embodiment differs from that shown in FIG. 1, in that a first dam pattern DP1 and a second dam pattern DP2 in a border area BA of a non-display area NDA are disposed to surround a display area DA.

As described above, the first dam pattern DP1 and the second dam pattern DP2 may be disposed on at least a side of the non-display area NDA. When the display area DA has a rectangular shape, the first dam pattern DP1 and the second dam pattern DP2 may be disposed on at least one side among four sides forming a periphery of the display area DA.

In the illustrated exemplary embodiment, the first dam pattern DP1 and the second dam pattern DP2 may be disposed adjacent to four sides forming an edge of the display area DA. The first dam pattern DP1 and the second dam pattern DP2 may have closed polygonal forms surrounding the edge of the display area DA, and the display area DA may be disposed in a closed space defined by the first dam pattern DP1. The first dam pattern DP1 may be disposed outside of the display area DA to surround the edge of the display area DA, and the second dam pattern DP2 may be disposed outside of the first dam pattern DP1 to surround an edge of the first dam pattern DP1 while being spaced apart from the first dam pattern DP1.

The first dam pattern DP1 and/or the second dam pattern DP2 may have a quadrilateral frame form exposing the display area DA, but the inventive concepts are not limited thereto. In some exemplary embodiments, the first dam pattern DP1 and/or the second dam pattern DP2 may also have forms in which corners thereof extend in an inclined direction. Although not illustrated in the drawing, the first dam pattern DP1 and the second dam pattern DP2 adjacent to the corners of the display area DA may extend at predetermined angles in a first direction DR1 or second direction DR2. As described above, when the first dam pattern DP1 and the second dam pattern DP2 adjacent to the corners of display area DA extend in the inclined direction, an area of the non-display area NDA adjacent to the corners of the display area DA may be decreased. Accordingly, since a ratio of the non-display area NDA to the display device 1 is decreased, a display device including a narrow bezel can be realized.

In a display device according to exemplary embodiments, a trench is formed in a first dam pattern disposed in a non-display area of the display device through an etching process during a manufacturing process, and thus, gas can be generated in advance. Accordingly, outgassing that may otherwise be generated from the first dam pattern due to light provided by a backlight unit is reduced when the display device is used, and thus, the display device may have high reliability.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device including a display area and a non-display area disposed outside the display area, the display device comprising:
 a first display substrate;
 a second display substrate opposite to the first display substrate; and
 a sealing member disposed between the first display substrate and the second display substrate in the non-display area and coupling the first display substrate to the second display substrate,
 wherein:
 the first display substrate includes a first substrate and an organic layer disposed on the first substrate;
 the organic layer includes a plurality of dam patterns disposed in the non-display area;
 the dam patterns include:
 a first dam pattern disposed in the non-display area, including a lower surface facing the first substrate and an upper surface opposite to the lower surface, not overlapping the sealing member, and having a first trench disposed in the non-display area and formed on the upper surface of the first dam pattern; and
 a second dam pattern disposed in the non-display area, overlapping the sealing member, and spaced apart from the first dam pattern and the sealing member; and
 the first trench extends only to a partial thickness of the first dam pattern the second dam pattern entirely overlaps the sealing member; first dam pattern does not overlap any portion of the sealing member; a bottom surface of the first trench does not overlap any portion of the sealing member; and the bottom surface of the first trench overlaps the entire lower surface of the first dam pattern.

2. The display device of claim 1, wherein the organic layer includes a photosensitive organic material having at least one of a red pigment, a green pigment, and a blue pigment.

3. The display device of claim 2, wherein the first dam pattern includes the photosensitive organic material having the blue pigment.

4. The display device of claim 2, wherein the organic layer further includes a color filter disposed in the display area.

5. The display device of claim 2, wherein the first dam pattern and the second dam pattern include substantially the same material.

6. The display device of claim 1, wherein the first trench extends on the upper surface of the first dam pattern in a direction parallel to a direction in which the first dam pattern extends.

7. The display device of claim 1, wherein the second dam pattern includes a second trench.

8. The display device of claim 7, wherein the first dam pattern and the second dam pattern have substantially the same form.

9. The display device of claim 1, further comprising an insulating layer disposed on the organic layer.

10. The display device of claim 9, wherein:
the insulating layer disposed on the first dam pattern includes a third trench overlapping the first trench; and
the first trench and the third trench form a trench structure.

11. The display device of claim 10, further comprising a first orientation film disposed on the insulating layer.

12. The display device of claim 11, wherein the first orientation film is disposed on the first trench and contacts at least a part of the first dam pattern.

13. A display device comprising:
a first substrate laterally extending along a first direction and having a display area and a non-display area a second substrate opposite to the first substrate;
a plurality of pixels disposed in the display area;
a gate conductive layer disposed on the first substrate;
a gate insulating layer disposed on the gate conductive layer;
a semiconductor layer disposed on the gate insulating layer;
a data conductive layer disposed on the semiconductor layer;
an organic layer disposed on the data conductive layer; and
a pixel electrode disposed on the organic layer,
wherein the organic layer includes:
a plurality of color filters disposed in the pixels; and
a plurality of dam patterns disposed in the non-display area and spaced apart from each other in the non-display area along the first direction, at least one of the dam patterns has a lower surface facing the first substrate and an upper surface opposite to the first surface, and includes a trench on the upper surface thereof in the non-display area, the trench not overlapping with the semiconductor layer, and
wherein the trench extends only to a partial thickness of the at least one of the dam patterns wherein the dam patterns include a first dam pattern not overlapping with the sealing member and a second dam pattern overlapping the sealing member, wherein the second dam pattern entirely overlaps the sealing member, wherein first dam pattern does not overlap any portion of the sealing member, wherein a bottom surface of the first trench does not overlap any portion of the sealing member, and wherein the bottom surface of the first trench overlaps the entire lower surface of the first dam pattern.

14. The display device of claim 13, further comprising a liquid crystal layer disposed between the second substrate and the pixel electrode.

15. The display device of claim 14, further comprising a sealing member disposed on an edge of the display device to couple the first substrate to the second substrate.

16. The display device of claim 13, further comprising a capping layer disposed between the organic layer and the pixel electrode, wherein the capping layer covers a part of the upper surface of the first dam pattern and exposes the trench.

17. The display device of claim 16, wherein the capping layer covers substantially the entire upper surfaces of the color filters.

18. The display device of claim 13, further comprising a first orientation film disposed on the first substrate between the pixel electrode and the second substrate.

19. The display device of claim 18, wherein the first orientation film is disposed to overlap at least a part of the trench of the first dam pattern and does not overlap the second dam pattern.

20. The display device of claim 1, wherein a height of the first trench is less than a thickness of the first dam pattern.

* * * * *